United States Patent
Norimine et al.

(10) Patent No.: US 12,159,989 B2
(45) Date of Patent: Dec. 3, 2024

(54) POWER STORAGE MODULE

(71) Applicant: Panasonic Intellectual Property Management Co., Ltd., Osaka (JP)

(72) Inventors: Shota Norimine, Osaka (JP); Mitsutoshi Tajima, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 744 days.

(21) Appl. No.: 17/297,393

(22) PCT Filed: Nov. 26, 2019

(86) PCT No.: PCT/JP2019/046104
§ 371 (c)(1),
(2) Date: May 26, 2021

(87) PCT Pub. No.: WO2020/111042
PCT Pub. Date: Jun. 4, 2020

(65) Prior Publication Data
US 2022/0006138 A1   Jan. 6, 2022

(30) Foreign Application Priority Data

Nov. 29, 2018 (JP) ................................. 2018-223543
Nov. 29, 2018 (JP) ................................. 2018-223544

(51) Int. Cl.
*H01M 10/6555* (2014.01)
*H01M 10/613* (2014.01)
(Continued)

(52) U.S. Cl.
CPC ..... *H01M 10/6555* (2015.04); *H01M 10/613* (2015.04); *H01M 10/647* (2015.04);
(Continued)

(58) Field of Classification Search
CPC ......... H01M 10/6555; H01M 10/6557; H01M 10/06
See application file for complete search history.

(56) References Cited

U.S. PATENT DOCUMENTS

2016/0036022 A1* 2/2016 Tononishi ........... H01M 10/658
429/53

FOREIGN PATENT DOCUMENTS

CN       104752649 A  *  7/2015 ............ H01M 10/04
JP       2014-010983 A   1/2014
(Continued)

OTHER PUBLICATIONS

Lai et al., A Power Battery Module of the Separator, a Battery Receiving Assembly and a Power Battery Module, Jul. 1, 2015, Machine English translation from PE2E search of CN 104752649(Year: 2015).*

(Continued)

*Primary Examiner* — James M Erwin
*Assistant Examiner* — Zackary Richard Cochenour
(74) *Attorney, Agent, or Firm* — Rimon P.C.

(57) ABSTRACT

A power storage module includes: a plurality of power storage devices arranged in a first direction; and a separator provided between two adjacent power storage devices and insulating the two power storage devices from each other. The power storage device includes an exterior can that have an opening, a sealing plate that blocks the opening, and a joint part between the exterior can and the sealing plate. The separator includes a contact area that abuts a surface of the exterior can facing the first direction and a separation area that overlaps the joint part as viewed in the first direction and concaved with respect to the contact area in a direction away from the exterior can.

18 Claims, 18 Drawing Sheets

(51) Int. Cl.
  *H01M 10/647* (2014.01)
  *H01M 50/183* (2021.01)
  *H01M 50/209* (2021.01)
  *H01M 50/262* (2021.01)
  *H01M 50/289* (2021.01)
  *H01M 50/30* (2021.01)
  *H01M 50/264* (2021.01)
  *H01M 50/278* (2021.01)

(52) U.S. Cl.
  CPC ....... *H01M 50/183* (2021.01); *H01M 50/209* (2021.01); *H01M 50/262* (2021.01); *H01M 50/289* (2021.01); *H01M 50/30* (2021.01); *H01M 50/264* (2021.01); *H01M 50/278* (2021.01)

(56) References Cited

FOREIGN PATENT DOCUMENTS

| | | |
|---|---|---|
| JP | 2015-201288 A | 11/2015 |
| JP | 2016-103378 A | 6/2016 |
| JP | 2016-152203 A | 8/2016 |
| JP | 2016-225166 A | 12/2016 |

OTHER PUBLICATIONS

International Search Report issued in corresponding International Patent Application No. PCT/JP2019/046104, dated Jan. 28, 2020, with English translation.

* cited by examiner

POWER STORAGE MODULE

CROSS-REFERENCE TO RELATED APPLICATIONS

This application is the U.S. National Phase under 35 U.S.C. § 371 of International Patent Application No. PCT/JP2019/046104, filed Nov. 26, 2019, which in turn claims the benefit of Japanese Patent Application No. 2018-223543, filed on Nov. 29, 2018, and Japanese Patent Application No. 2018-223544, filed Nov. 29, 2018, the entire disclosures of which applications are incorporated by reference herein.

BACKGROUND

Field of the Invention

The present disclosure relates to power storage modules.

Description of the Related Art

A power storage module in which a plurality of power storage devices (e.g., batteries) are connected in series is known as a power supply for a vehicle, etc. for which a high output voltage is required. Generally, a power storage module includes a plurality of power storage devices, a plurality of separators provided between adjacent power storage devices, a pair of endplates provided at the ends in the direction of arrangement of the power storage devices, and a binding bar fitted around the pair of endplates to bind the plurality of power storage devices in the direction of arrangement.

Further, a power storage module generally includes an exterior can having an opening, an electrode body housed in the exterior can, and a sealing plate that seals the opening of the exterior can. A power storage device like this tends to swell as the device is charged. Swelling of the power storage device is induced by an increase in the gas pressure inside the exterior can or swelling of the electrode body. In the power storage module according to the related art, swelling is suppressed by the endplate and the binding bar.

In connection with the power storage module as described above, Patent Literature 1 discloses an assembled battery including a secondary battery having a flat and rectangular shape and a spacer provided on both ends of the secondary battery in the direction of thickness. In this assembled battery, the broader lateral surface of the secondary battery is provided with an intermediate area aligned with the mixed layer of the electrode and with a peripheral area around the intermediate area. Further, the spacer has a contact part that comes into contact with the peripheral area of the broader lateral surface and a hollow part adjacent to the intermediate area of the broader lateral surface. The dimension of the hollow part in the direction of thickness is equal to or larger than the amount of swelling of the broader lateral surface occurring when the secondary battery is fully charged. In the assembled battery disclosed in Patent Literature 1, the intermediate area of the broader lateral surface is prevented from receiving a repulsive force from the spacer when the battery swells, by providing a gap between the intermediate area of the broader surface of the container and the spacer.
Patent Literature 1: JP2016-152203

Recently, power storage modules having higher capacity are required, and efforts have been made to increase the capacity of power storage devices to meet the requirement. When the capacity of the power storage device is increased, however, the amount of swelling of the power storage device increases. In the related-art power storage module in which the peripheral part of the exterior can of the power storage device is suppressed by a spacer, the load applied to the joint part between the exterior can and the sealing plate will be excessive as the amount of swelling of the power storage device increases, with the result that the joint part might be damaged. Also, in the structure in which the peripheral part of the exterior can is suppressed by a spacer, a large load may be applied to the joint part when the power storage device is bound by the binding bar to assemble the power storage module, with the result that the joint part might be damaged. A damage to the joint part could lead to a drop in the reliability of the power storage module and so is desired to be avoided.

SUMMARY OF THE INVENTION

The present disclosure addresses the above-described issue, and a purpose thereof is to provide a technology for enhancing the reliability of a power storage module.

An embodiment of the present disclosure relates to a power storage module. The power storage module includes: a plurality of power storage devices arranged in a first direction; and a separator provided between two adjacent power storage devices and insulating the two power storage devices from each other. The power storage device includes an exterior can that have an opening, a sealing plate that blocks the opening, and a joint part between the exterior can and the sealing plate. The separator includes a contact area that abuts a surface of the exterior can facing the first direction and a separation area that overlaps the joint part as viewed in the first direction and concaved with respect to the contact area in a direction away from the exterior can.

Optional combinations of the aforementioned constituting elements, and implementations of the invention in the form of methods, apparatuses, and systems may also be practiced as additional modes of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
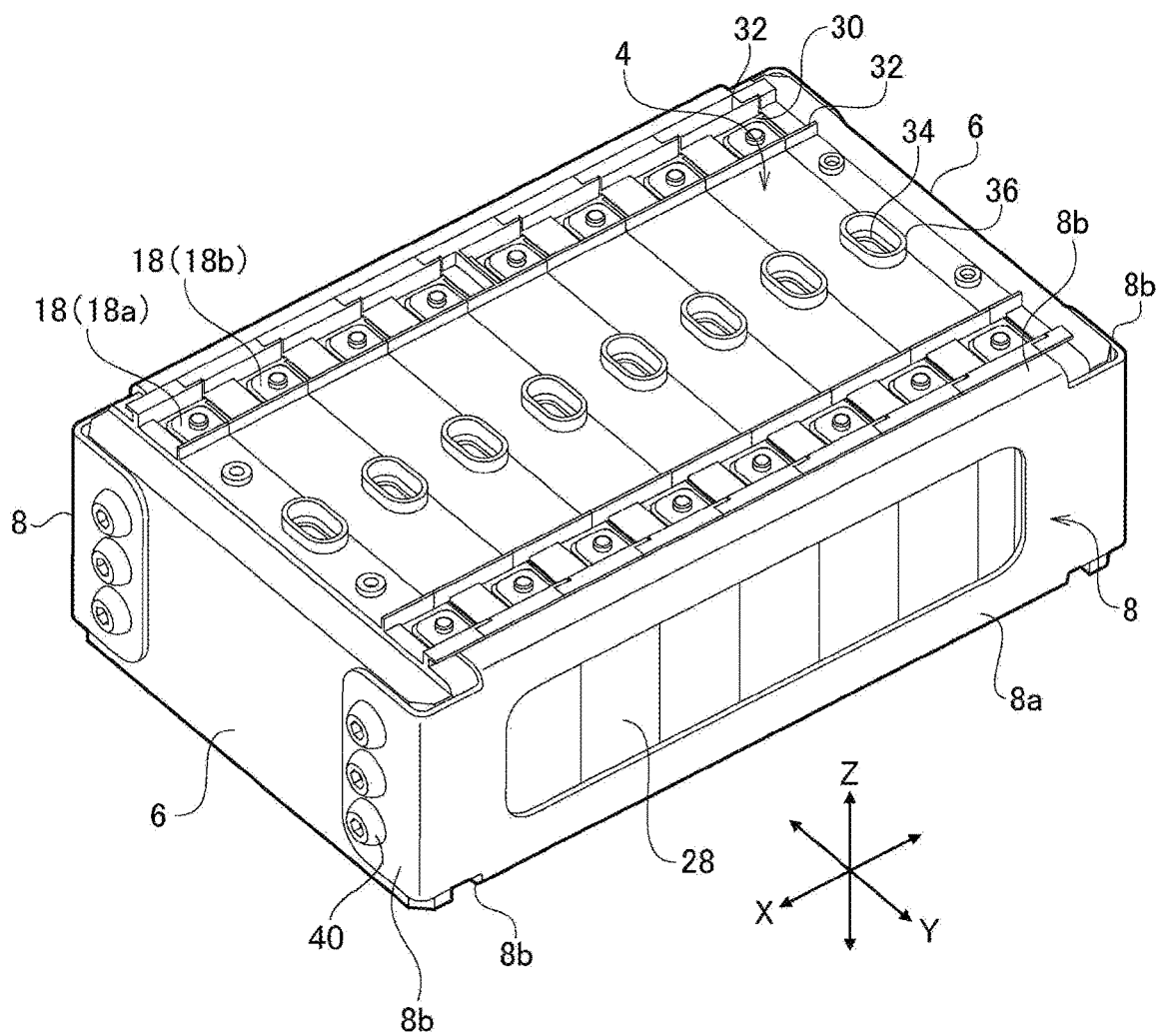
FIG. 1 is a perspective view of a power storage module according to embodiment 1.

Hereinafter, the present disclosure will be described based on preferred embodiments with reference to the accompanying drawings. The embodiments do not intend to limit the scope of the disclosure but exemplify the disclosure. Not all of the features and the combinations thereof described in the embodiments are necessarily essential to the disclosure. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless specified otherwise and are used to distinguish a certain feature from the others. Those of the members that are not important in describing the embodiment are omitted from the drawings.

Embodiment 1

Figure 2:
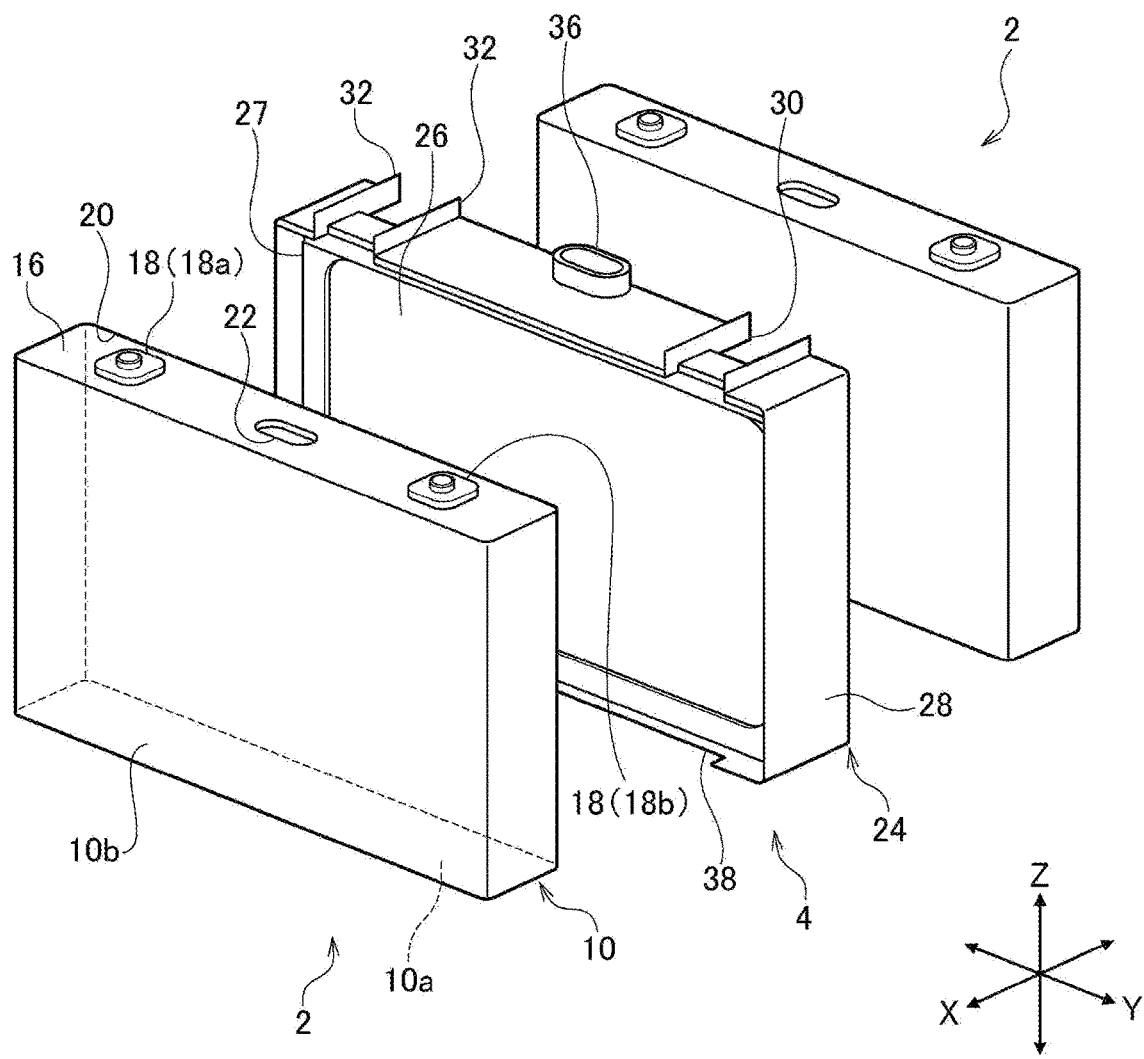
FIG. 2 is an exploded perspective view of a power storage device and a separator.

FIG. 1 is a perspective view of a power storage module according to embodiment 1. FIG. 2 is an exploded perspective view of a power storage device and a separator. The power storage module 1 includes a plurality of power storage devices 2, a plurality of separators 4, a pair of endplates 6, and a pair of binding members 8.

Each power storage device 2 is a rechargeable secondary battery exemplified by a lithium-ion battery, a nickel-hydrogen battery, a nickel-cadmium battery, etc. The power storage device 2 is a so-called rectangular battery and has an exterior can 10 having a flat and cuboid shape. The exterior can 10 has a rectangular opening 12 (see FIG. 5) on one surface. An electrode body 14 (see FIG. 5) including an anode and a cathode, an electrolyte solution, etc. are housed in the exterior can 10 via the opening 12. A sealing plate 16 that blocks the opening 12 to seal the exterior can 10 is provided in the opening 12. The sealing plate 16 is, for example, a rectangular plate.

The exterior can 10 has a bottom surface 10a opposite to the sealing plate 16. Further, the exterior can 10 has four lateral surfaces connecting the opening 12 and the bottom surface 10a. Two of the four lateral surfaces comprise a pair of longer-side lateral surfaces 10b connected to the two longer sides of the opening 12 opposite to each other. Each longer-side lateral surface 10b represents a surface having the largest area among the surfaces of the exterior can 10, i.e., represents the principal surface. The remaining two lateral surfaces excluding the two longer-side lateral surfaces 10b comprise a pair of shorter-side lateral surfaces connected to the shorter sides of the opening 12 of the exterior can 10 and the shorter sides of the bottom surface 10a.

The sealing plate 16 is provided, toward one end in the longitudinal direction, with an output terminal 18 electrically connected to the anode of the electrode body 14 and provided, toward the other end, with an output terminal 18 electrically connected to the cathode of the electrode body 14. Hereinafter, the output terminal 18 connected to the anode will be referred to as an anode terminal 18a, and the output terminal 18 connected to the cathode will be referred to as a cathode terminal 18b as appropriate. When there is no need to distinguish between the polarity of the output terminals 18, the anode terminal 18a and the cathode terminal 18b are generically referred to as the output terminal 18. The exterior can 10 and the sealing plate 16 are conductors and are made of, for example, a metal such as aluminum, iron, and stainless steel. The sealing plate 16 and the exterior can 10 are joined by, for example, a laser. Accordingly, the power storage device 2 has a joint part 20 between the exterior can 10 and the sealing plate 16. By way of one example, the joint part 20 is provided over the entirety of the outer circumference of the sealing plate 16. The sealing plate 16 and the exterior can 10 may be joined by friction stir welding or brazing and soldering instead of a laser.

In the description of this embodiment, the surface provided with the sealing plate 16 is defined as the top surface of the power storage device 2 for convenience. Further, the bottom surface 10a of the exterior can 10 is defined as the bottom surface of the power storage device 2, the longer-side lateral surface 10b of the exterior can 10 is defined as the longer-side lateral surface of the power storage device 2, and the shorter-side lateral surface of the exterior can 10 is defined as the shorter-side lateral surface of the power storage device 2. In the power storage module 1, the surface toward the top surface of the power storage device 2 is defined as the top surface of the power storage module 1, the surface toward the bottom surface of the power storage device 2 is defined as the bottom surface of the power storage module 1, and the surface toward the shorter-side lateral surface of the power storage device 2 is defined as the lateral surface of the power storage module 1. The direction toward the top surface of the power storage module 1 is defined as the upward, vertical direction. The direction toward the bottom surface of the power storage module 1 is defined as the downward, vertical direction. These directions and positions are defined for convenience. Therefore, it does not necessarily mean that the part defined as the top surface in the disclosure is located above the part defined as the bottom surface. Therefore, the sealing plate 16 is not necessarily located above the bottom surface 10a of the exterior can 10.

A safety valve 22 is provided between the pair of output terminals 18 on the sealing plate 16. The safety valve 22 is configured to open to release the gas inside the exterior can 10 when the internal pressure in the exterior can 10 rises to a predetermined value or higher. The safety valve 22 of each power storage device 2 is connected to a gas duct (not shown), and the gas inside the power storage device 2 is discharged to the gas duct from the safety valve 22. The safety valve 22 is comprised of, for example, a thin part provided in a part of the sealing plate 16 and having a smaller thickness than the other parts, and a linear groove formed on the surface inside the thin part. When the internal pressure of the exterior can 10 rises in this configuration, the safety valve 22 opens as the thin part is split around the groove.

A plurality of power storage devices 2 form an assembly by being arranged at predetermined intervals such that the longer-side lateral surfaces 10b of adjacent power storage devices 2 face each other. In this embodiment, the direction in which the plurality of power storage devices 2 are arranged is defined as the first direction X. Further, the direction in which the sealing plate 16 extends is defined as the second direction Y, and the direction in which the sealing plate 16 and the bottom surface 10a are aligned is defined as the third direction Z. The output terminals 18 of the respective power storage devices 2 are arranged to face the same direction. In this embodiment, the output terminals 18 of the respective power storage devices 2 are arranged to face upward in the vertical direction for convenience. Alternatively, the output terminals 18 of the respective power storage devices 2 may be arranged to face different directions.

Two adjacent power storage devices 2 are stacked such that the anode terminal 18a of one of the power storage device 2 is adjacent to the cathode terminal 18b of the other power storage device 2. The anode terminal 18a and the cathode terminal 18b are connected in series via a bus bar (not shown). The output terminals 18 of the same polarity in a plurality of adjacent power storage devices 2 may be connected in parallel to form a power storage device block, and power storage device blocks may be connected in series.

The separator 4 is also referred to as an insulating separator and is provided between two adjacent power storage devices 2 to insulate the two power storage devices 2 electrically. The separator 4 according to this embodiment includes a frame part 24 and a thermal conduction suppression part 26. The frame part 24 is made of, for example, an insulative resin. The resin forming the frame part 24 is exemplified by a thermoplastic resin such as polypropylene (PP), polybutylene terephthalate (PBT), polycarbonate (PC), and Noryl (registered trademark) resin (modified PPE).

The frame part 24 includes a locking part 27 interposed between the longer-side lateral surfaces 10b of the two adjacent power storage devices 2. The interposing locking part 27 insulates the two adjacent power storage devices 2 from each other. The frame part 24 has a polygonal annular shape (in this embodiment, a rectangular annular shape) corresponding to the shape of the longer-side lateral surface 10b. The inner side of the frame or the annule corresponds to the central side of the power storage module 1 on the YZ plane, and the outer side of the frame or the annule corresponds to the outer side of the power storage module 1 on the YZ plane. The YZ plane is a plane that extends in the second direction Y and in the third direction Z.

Further, the frame part 24 includes a wall part 28. The wall part 28 is connected to the outer circumferential surface of the locking part 27 and extends in the first direction X to cover the top surface, the shorter-side lateral surface, and the bottom surface of the power storage device 2. This ensures a creepage distance between the adjacent power storage devices 2 or between the power storage device 2 and the endplate 6. Further, the position of the power storage device 2 in the second direction Y and the third direction Z can be restricted. Further, the power storage device 2 and the binding member 8 are insulated electrically from each other. In this embodiment, the locking part 27 and the wall part 28 are formed integrally.

A notch 30 is provided at a position of the wall part 28 corresponding to the output terminal 18 so as to expose the output terminal 18. The wall part 28 is also provided with a pair of protruding wall parts 32 that protrude in the third direction Z in which the sealing plate 16 and the bottom surface 10a are aligned. The pair of protruding wall parts 32 are arranged to sandwich the notch 30 in the second direction Y in which the sealing plate 16 extends, i.e., the second direction Y in which the two output terminals 18 are arranged.

An opening 34 is provided at a position of the wall part 28 corresponding to the safety valve 22 to expose the safety valve 22. A cylindrical duct part 36 that protrudes from the wall part 28 in the third direction Z is provided around the opening 34. The duct part 36 encircles the entirety of the opening 34. The duct part 36 connects the safety valve 22 and the gas duct (not shown). A notch 38 is provided at a position of the wall part 28 corresponding to the bottom surface 10a of the exterior can 10 to expose a part of the bottom surface 10a. By way of example, a cooling plate is thermally coupled to the bottom surface 10a of the power storage device 2.

The thermal conduction suppression part 26 is interposed between the longer-side lateral surfaces 10b of the two adjacent power storage devices 2 to suppress thermal conduction between the two power storage devices 2. Even when the temperature of any given power storage device 2 rises excessively while the power storage module 1 is being used, the heat is inhibited from being conducted to the adjacent power storage device 2. Therefore, a chain reaction of excessive heat (a chain reaction of thermal runaway) is inhibited. The thermal conduction suppression part 26 is also insulative. The thermal conduction suppression part 26 is shaped in a plate or a sheet. By way of example, the thermal conduction suppression part 26 is made of an adiabatic member and a laminated film. For example, the thickness of the thermal conduction suppression part 26 is 1-2 mm.

The adiabatic member is shaped in a sheet and has a structure in which a porous member such as silica xerogel is supported between fibers of a fibrous sheet of non-woven fabric, etc. Silica xerogel has a nanosized void structure that restricts movement of air molecules and has a low thermal conductivity. The thermal conductivity of the adiabatic member is about 0.018-0.024 W/m·K. The adiabatic member is especially useful as an adiabatic member used in a narrow space. The thermal conductivity of the adiabatic member is lower than the thermal conductivity of air. By providing the thermal conduction suppression part 26, therefore, it is possible to suppress thermal conduction between the two adjacent power storage devices 2 more successfully than when only an air layer is interposed between the power storage devices 2. The thermal conduction suppression part 26 has a lower thermal conductivity than the frame part 24.

Further, silica xerogel has a relatively high structural stability in the presence of an external pressure. For this reason, the adiabatic performance of the adiabatic member can be maintained in a stable manner. Therefore, thermal conduction between the power storage devices 2 can be suppressed in a more stable manner by providing the thermal conduction suppression part 26 in the power storage module 1.

Further, the adiabatic member has a lower thermal conductivity than air so that it is possible to obtain an equivalent adiabatic effect with a layer thickness smaller than that of an air layer. Accordingly, the size of the power storage module 1 is inhibited from being increased.

A laminated film is a member for covering and protecting the entirety of the adiabatic member. With a laminated film, it is possible to inhibit the porous member in the adiabatic member from being dislodged from the fibrous sheet. Further, covering the adiabatic member with a laminated film makes it easier to set the thermal conduction suppression part 26 in the frame part 24 when the power storage module 1 is assembled. The laminated film is made of, for example, polyethylene terephthalate (PET), etc.

The thermal conduction suppression part 26 has a higher heat resistance than the frame part 24. To be more specific, the heat resistance of the adiabatic member is higher than the heat resistance of the frame part 24. To be even more specific, the fibrous sheet includes fibers having a higher melting point than the frame part 24, or the porous member is made of a substance having a higher melting point than the frame part 24, or both. For example, the melting point of the adiabatic member is 300° C. or higher. To be more specific, the melting point of the fibrous sheet and/or the porous material forming the adiabatic member is 300° C. or higher. Particularly, it is preferable that the melting point of the fibers forming the fibrous sheet be 300° C. or higher. This can maintain a state in which the fibrous sheet supports the porous material even when the adiabatic member is exposed to a higher temperature.

By configuring the heat resistance of the thermal conduction suppression part 26 to be higher than the heat resistance of the frame part 24, it is ensured that the thermal conduction suppression part 26 remains even when the frame part 24 is melted by the heat generated in the power storage device 2. Thus, the thermal conduction suppression part 26 can maintain insulation between the power storage devices 2 even when the frame part 24 is melted. Further, the state in which thermal conduction between adjacent power storage devices 2 is suppressed can be maintained for a longer period of time than otherwise.

The plurality of power storage devices 2 and the plurality of separators 4 arranged side by side are sandwiched by the pair of endplates 6 in the first direction X. For example, a separator in which the thermal conduction suppression part 26 is not assembled is provided between the pair of endplates 6 and the power storage devices 2 located at the respective ends in the first direction X. This insulates the power storage devices 2 and the endplates 6 electrically and avoids heat dissipation from the power storage devices 2 via the endplates 6 from being obstructed. Preferably, the separator includes a separation area 48 described later. The endplate 6 is formed by, for example, a metal plate. The surface of the endplate 6 facing the longer-side lateral surface 10b of the exterior can 10 is provided with a screw hole (not shown) threadably engaged with a screw 40.

The pair of binding members 8 are also called binding bars and are elongated members with the first direction X being defined as the longitudinal direction. The pair of binding members 8 are arranged in the second direction Y in which the pair of output terminals 18 are arranged so as to face each other. The plurality of power storage devices 2, the plurality of separators 4, and the pair of endplates 6 are interposed between the pair of binding members 8. Each binding member 8 has a rectangular flat part 8a extending parallel to the shorter-side lateral surface of the power storage device 2 and four peak parts 8b protruding from the respective edges of the flat part 8a toward the power storage device 2. The two peak parts 8b opposite to each other in the first direction X are provided with through holes (not shown) in which the screw 40 is inserted.

The plurality of power storage devices 2, the plurality of separators 4 and the pair of endplates 6 are sandwiched by the pair of binding members 8 in the second direction Y such that the plurality of power storage devices 2 and the plurality of separators 4 are arranged alternately and are sandwiched by the pair of endplates 6 in the first direction X. Each binding member 8 is positioned such that the through hole of the peak part 8b is aligned with the screw hole of the endplate 6. The screw 40 is inserted into the through hole and threadably engaged with the screw hole. In this way, the pair of binding members 8 are engaged with the pair of endplates 6 to bind the plurality of power storage devices 2. The plurality of power storage devices 2 and the plurality of separators 4 are fastened by the binding members 8 such that a predetermined pressure is applied in the first direction X.

The plurality of power storage devices 2 are positioned in the first direction X by being fastened by the binding members 8 in the first direction X. The top surfaces and the bottom surfaces of the plurality of power storage devices 2 come into contact with the two peak parts 8b opposite to each other in the third direction Z in which the top surfaces and the bottom surfaces are aligned, via the wall part 28 of the separator 4. In this way, the plurality of power storage devices 2 are positioned in the third direction Z. By way of example, a bus bar is attached to the output terminal 18 of each power storage device 2 once the power storage devices 2 are positioned so that the output terminals 18 of the plurality of power storage devices 2 are connected to each other electrically. For example, the bus bar is fixed to the output terminal 18 by welding.

The top surfaces of the plurality of power storage devices 2 are covered by a cover member (not shown). The cover member is supported by the protruding wall part 32. The cover member prevents contact of dew condensation water, dust, etc. with the output terminals 18, the bus bar, the safety valve 22, etc. of the power storage device 2. The cover member is made of, for example, an insulative resin.

Figure 3:
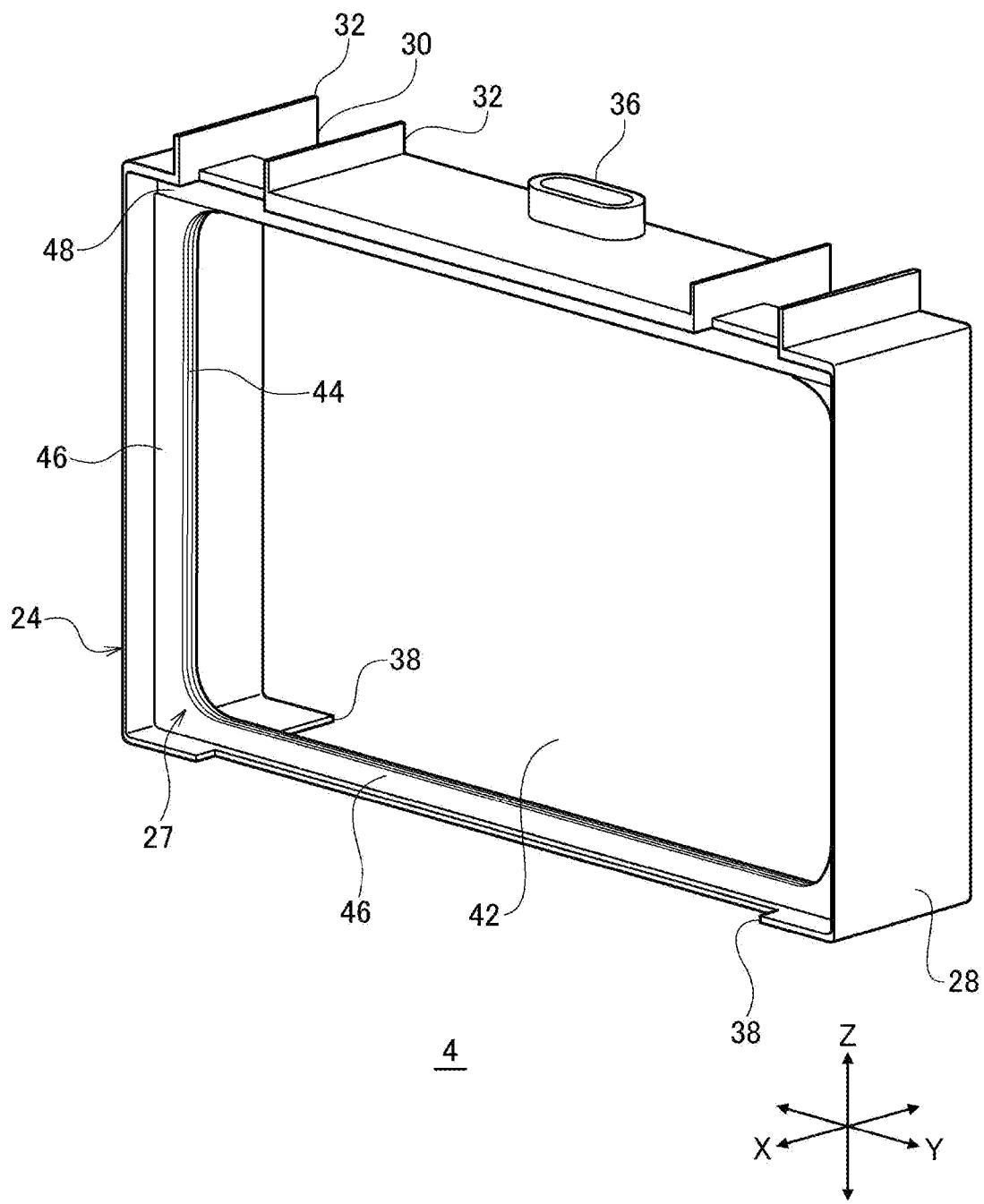
FIG. 3 is a perspective view of the separator.
Figure 4:
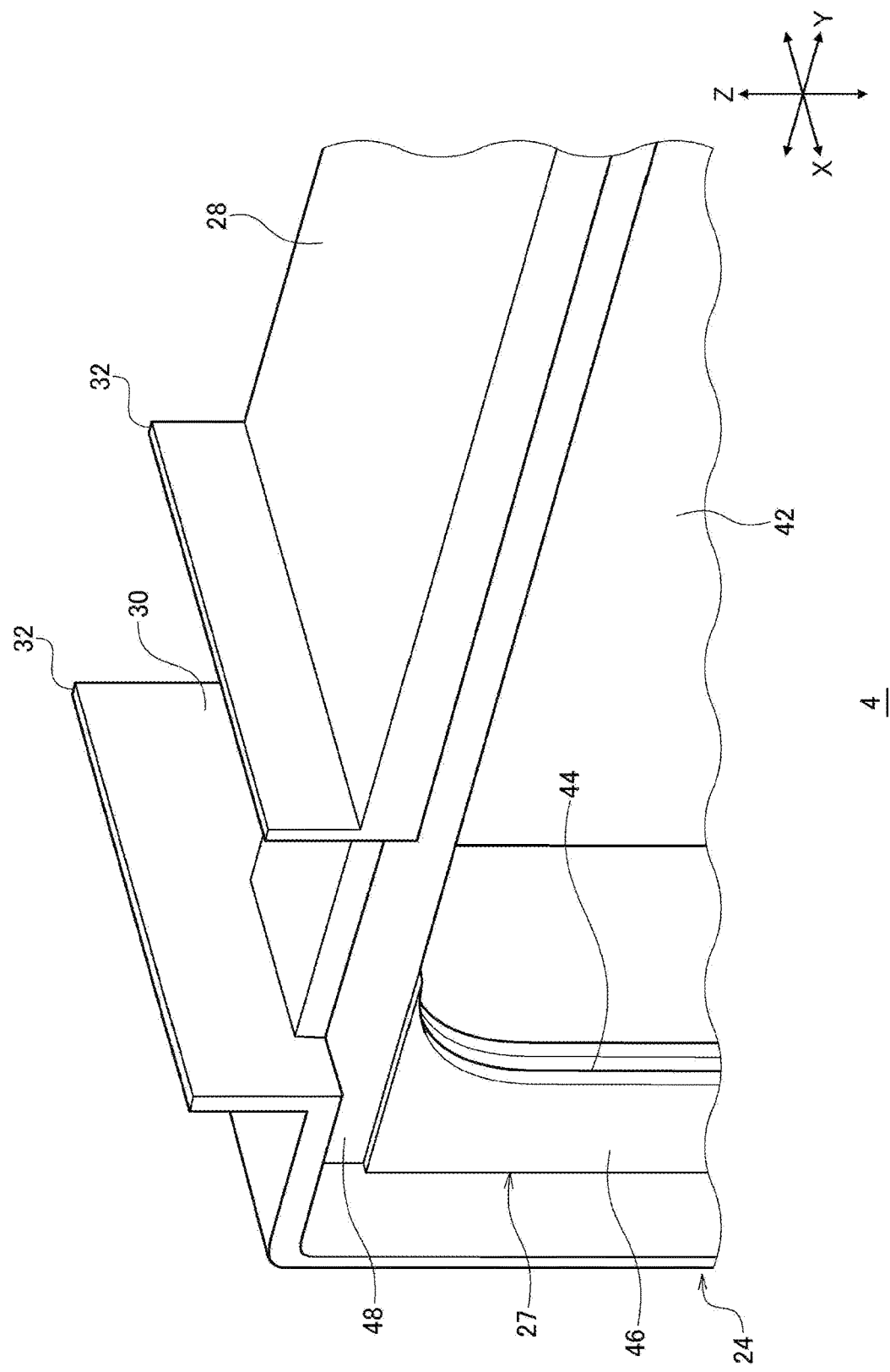
FIG. 4 is a perspective view showing a part of the separator on an enlarged scale.
Figure 5:
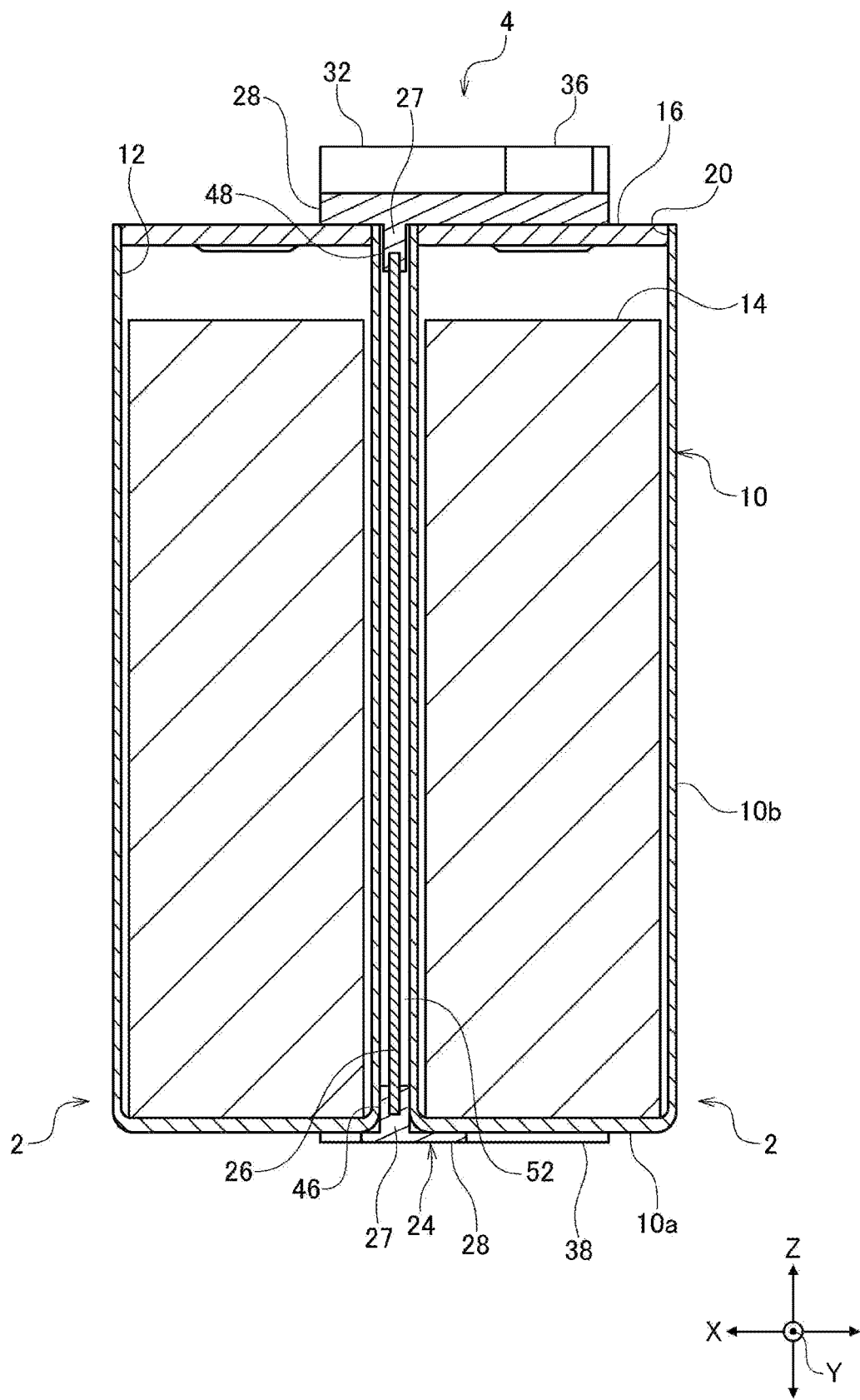
FIG. 5 is a cross-sectional view of a part of the power storage module.
Figure 6:
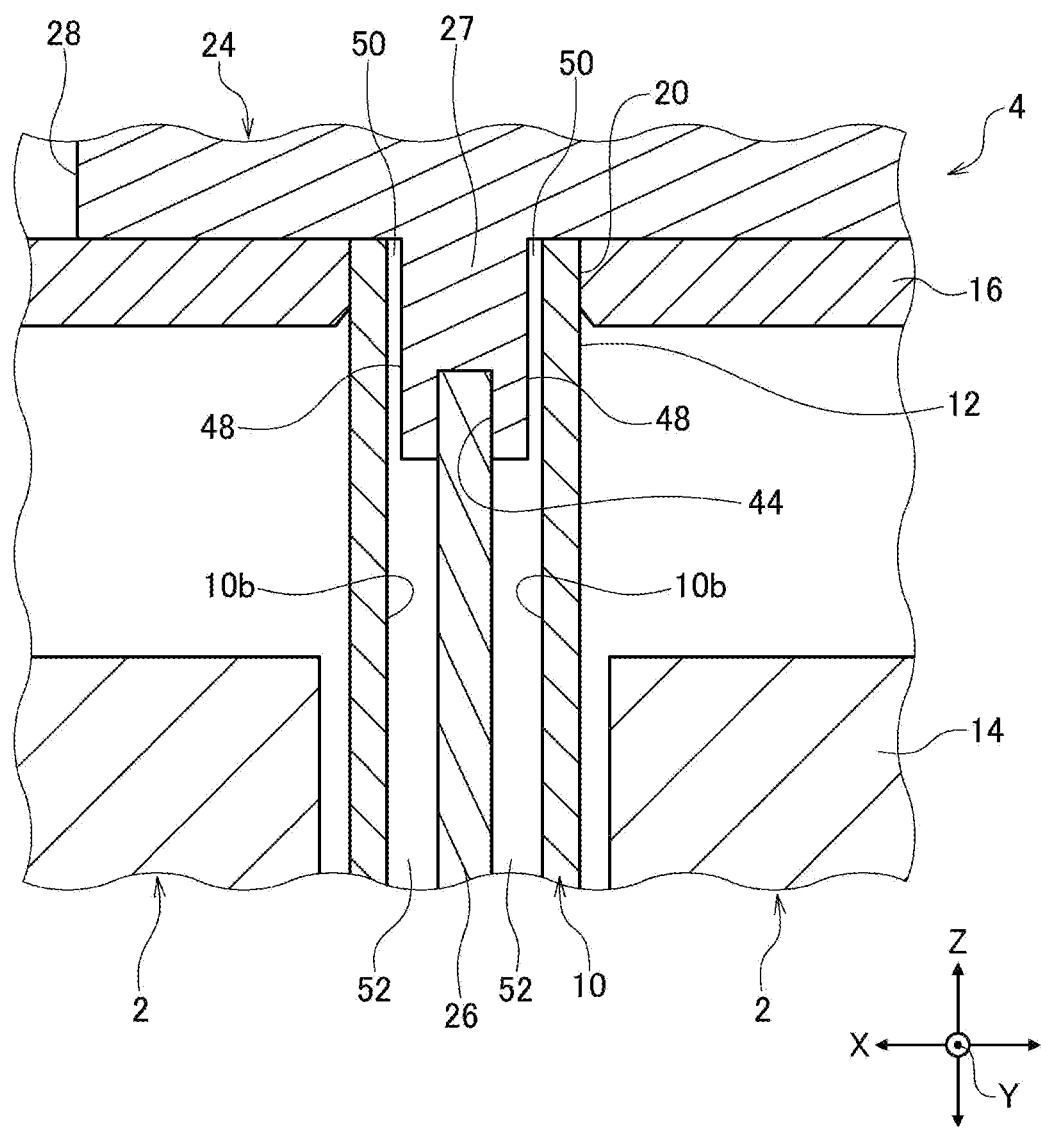
FIG. 6 is a cross-sectional view of a part of the upper part of the power storage module on an enlarged scale.
Figure 7:
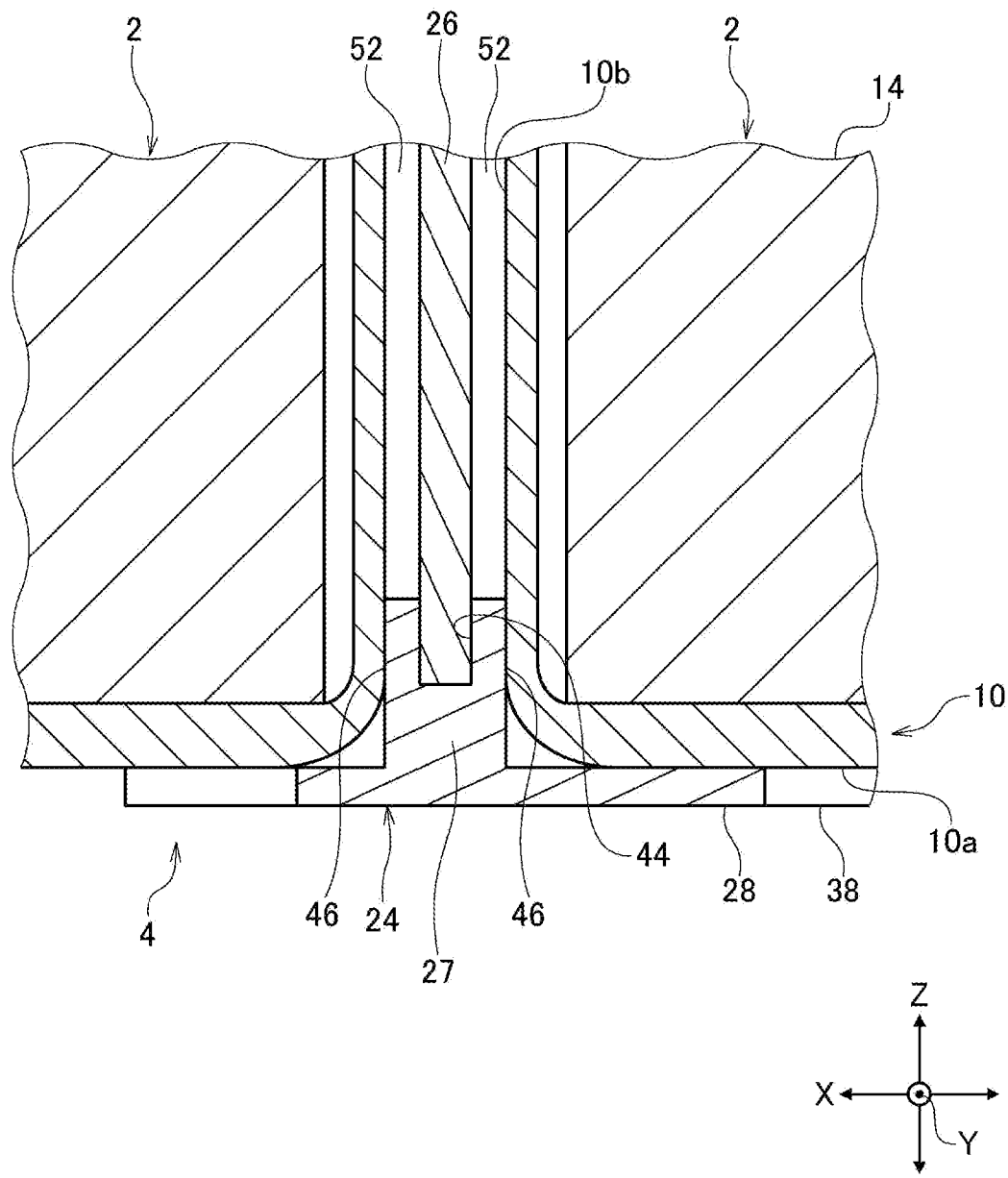
FIG. 7 is a cross-sectional view showing a part of the lower part of the power storage module on an enlarged scale.

FIG. 3 is a perspective view of the separator. FIG. 4 is a perspective view showing a part of the separator on an enlarged scale. FIG. 5 is a cross-sectional view of a part of the power storage module. FIG. 6 is a cross-sectional view of a part of the upper part of the power storage module on an enlarged scale. FIG. 7 is a cross-sectional view showing a part of the lower part of the power storage module on an enlarged scale. In FIG. 3 and FIG. 4, illustration of the thermal conduction suppression part 26 is omitted. FIGS. 5-7 show, as a part of the power storage module 1, two arbitrary power storage devices 2 and the separator 4 provided therebetween. Also, the figures show the internal structure of the power storage device 2 schematically.

As described above, the separator 4 includes the frame part 24 and the thermal conduction suppression part 26. The locking part 27 of the frame part 24 includes a hole 42 interposed between the two adjacent power storage devices 2 and extending between the two power storage devices 2. Further, the frame part 24 extends along the peripheral part of the exterior can 10 as viewed in the first direction X in which the power storage devices 2 are arranged. Therefore, the hole 42 is aligned with the central part of the exterior can 10 as viewed in the first direction X. Stated otherwise, the hole 42 is a through hole extending through the separator 4 in the first direction X.

The thermal conduction suppression part 26 is provided to block the hole 42. The locking part 27 of the frame part 24 has a certain thickness in the first direction X and has a groove part 44 on the inner circumferential surface of the frame part 24 facing the hole 42. The groove part 44 extends over the entirety of the hole 42. The thermal conduction suppression part 26 is supported by the frame part 24 such that the peripheral part thereof is fitted in the groove part 44. The groove part 44 may not extend over the entirety of the hole 42. For example, the groove part 44 may be formed only at both ends of the thermal conduction suppression part 26 to support the ends of the thermal conduction suppression part 26.

The method to install the thermal conduction suppression part 26 in the frame part 24, i.e., the method of assembling the separator 4 is exemplified by the following method. For example, the frame part 24 is divided into a plurality of (e.g., two) pieces in the second direction Y or the third direction Z. The pieces are arranged to sandwich the thermal conduction suppression part 26, and the ends of the thermal conduction suppression part 26 are positioned in the groove parts 44 of the respective pieces, and, afterwards, the pieces are brought closer to each other. After the pieces abut each other, the pieces are fixed by, for example, adhesion. This causes the peripheral parts of the thermal conduction suppression part 26 to be inserted into the groove parts 44 and supported by the frame part 24. Alternatively, a slit for inserting the thermal conduction suppression part 26 into the hole 42 may be provided in the frame part 24, and the thermal conduction suppression part 26 may be inserted into the frame part 24 via the slit. Alternatively, the frame part 24 may be divided in the first direction X, and the separator 4 may be assembled by causing the respective pieces to sandwich the thermal conduction suppression part 26 in the first direction X. Alternatively, the separator 4 may be formed by integrally molding the frame part 24 and the thermal conduction suppression part 26.

Further, the separator 4 includes a contact area 46 and an separation area 48. In this embodiment, the contact area 46 and the separation area 48 are provided in the frame part 24. More specifically, the contact area 46 and the separation area 48 are arranged on the lateral surfaces of the locking part 27 of the frame part 24 facing the first direction X in which the power storage devices 2 are arranged. The contact area 46 abuts the surface of each exterior can 10 facing the first direction X, i.e., the longer-side lateral surface 10b. This positions each power storage device 2 in the first direction X. It also suppresses swelling of the exterior can 10. The contact area 46 of this embodiment comes into contact with three edge parts including an edge part of the longer-side lateral surface 10b adjacent to the bottom surface 10a and edge parts adjacent to the pair of shorter-side lateral surfaces. Therefore, the contact area 46 is substantially U-shaped as viewed in the first direction X.

The separation area 48 has a shape concaved with respect to the contact area 46 in the direction away from the exterior can 10. The separation area 48 is provided to overlap the joint part 20 as viewed in the first direction X. The longer-side lateral surface 10b of this embodiment is rectangular. The contact area 46 overlaps three of the four edges of the longer-side lateral surface 10b facing the first direction X, and the separation area 48 overlaps the remaining edge of the four sides.

An air gap 50 is provided between the separation area 48 of the frame part 24 and the longer-side lateral surface 10b of the exterior can 10. By providing the frame part 24 with the separation area 48, it is possible to avoid the joint part 20 from being pressured by the frame part 24 when the power storage module 1 is assembled. This reduces the load applied by the pressure from the separator 4 to the joint part 20 when the power storage module 1 is assembled. The separation area 48 may be provided to extend intermittently in the second direction Y or the third direction Z.

The neighborhood of the joint part 20 in the exterior can 10 swells without being pressured by the frame part 24 in the initial stage of swelling of the exterior can 10. When the exterior can 10 has swollen by a certain amount, the exterior can 10 comes into contact with the separation area 48, inhibiting further swelling of the exterior can 10. This inhibits excessive deformation of the joint part 20. As a result, the load applied to the joint part 20 by the deformation is reduced.

The separation area 48 of this embodiment extends over the entirety of the locking part 27 in the second direction Y in which the sealing plate 16 extends. In other words, the ends of the separation area 48 in the second direction Y come into contact with the wall part 28 extending parallel to the shorter-side lateral surface of the power storage device 2. Therefore, the separation area 48 overlaps the entirety of the joint part 20 in the second direction Y in which the sealing plate 16 extends, as viewed in the first direction X. In this way, the load applied to the joint part 20 is more successfully reduced than otherwise. The ends of the separation area 48 in the second direction Y may be connected to the part of the contact area 46 extending in the third direction Z. This enhances the mechanical strength of the frame part 24 and enhances the reliability related to the retention of the power storage device 2.

The separation area 48 also overlaps the entirety of the joint part 20 in the direction of thickness of the sealing plate 16, i.e., the third direction Z. Stated otherwise, the separation area 48 extends from the surface of the sealing plate 16 facing away from the power storage device 2 toward the surface facing the interior space of the power storage device 2. This reduces the load applied to the joint part 20 more successfully than otherwise. Further, the separation area 48 protrudes away from the sealing plate 16 toward the surface of the exterior can 10 opposite to the sealing plate 16, i.e., toward the bottom surface 10a. In other words, the separation area 48 extends toward the bottom surface 10a beyond the surface of the sealing plate 16 facing the interior space of the power storage device 2. This also reduces the load applied to the joint part 20 more successfully than otherwise.

In further accordance with this embodiment, the part of the frame part 24 extending along the joint part 20, i.e., the part where the separation area 48 is provided, is provided outside the electrode body 14 as viewed in the first direction X. Swelling of the exterior can 10 is mainly caused by swelling of the electrode body 14. By providing that part of the frame part 24 outside the electrode body 14, therefore, the separation area 48 does not overlap the electrode body 14, and the load applied to the joint part 20 is more successfully reduced than otherwise.

Further, the peripheral part of the thermal conduction suppression part 26 is fitted in the groove part 44 of the frame part 24. In other words, the frame part 24 supports the thermal conduction suppression part 26 by sandwiching the peripheral parts of the thermal conduction suppression part 26 in the first direction X. This causes a part of the frame part 24 to be interposed between the peripheral part of the thermal conduction suppression part 26 and peripheral part of the longer-side lateral surface 10b of the exterior can 10. Consequently, an air gap 52 is formed between the central part of the thermal conduction suppression part 26 and the central part of the longer-side lateral surface 10b.

By providing the air gap 52, the central part of the exterior can 10 swells without coming into contact with the thermal conduction suppression part 26 at least in the initial stage of swelling of the exterior can 10. In other words, the air gap 52 functions as a space that permits swelling of the exterior can 10 by a certain amount. This inhibits deformation, i.e., compression in the first direction X, of the thermal conduction suppression part 26 due to the swelling of the exterior can 10. Consequently, the adiabatic performance of the thermal conduction suppression part 26 is inhibited from dropping. It also reduces the load applied to the endplate 6 and the binding member 8. It is therefore possible to avoid increasing the strength of the endplate 6 or the binding member 8 to counter an increase in the amount of swelling of the power storage device 2. Consequently, the cost of the power storage module 1 is inhibited from increasing, and the workability of the endplate 6 or the binding member 8 is inhibited from dropping. The size of the air gap 52 in the first direction X may be equal to or larger than the size of the air gap 50 in the first direction X. This secures a space in which the exterior can 10 swells while at the same time providing the separation area 48.

As described above, the power storage module 1 according to this embodiment includes the plurality of power storage devices 2 and the separator 4 provided between two adjacent power storage devices 2 and insulating the two power storage devices 2 from each other. The power storage device 2 includes the exterior can 10 having the opening 12, the sealing plate 16 that blocks the opening 12, and the joint part 20 between the exterior can 10 and the sealing plate 16. The separator 4 includes: the contact area 46 that abuts the surface of the exterior can 10 facing the first direction X in which the power storage devices 2 are arranged; and the separation area 48 overlapping the joint part 20 as viewed in the first direction X and concaved with respect to the contact area 46 in the direction away from the exterior can 10.

Providing the separator 4 with the separation area 48 reduces the load applied to the joint part 20 when the plurality of power storage devices 2 and the plurality of separators 4 are compressed in the first direction X and bound by the binding members 8 to assemble the power storage module 1. It also reduces the load repeatedly applied to the joint part 20 when the exterior can 10 swells. When the exterior can 10 has swollen to a certain size, the exterior can 10 comes into contact with the separation area 48, inhibiting further swelling of the exterior can 10. This inhibits excessive deformation of the joint part 20 and reduces the load applied to the joint part 20 due to the deformation.

As described above, the power storage module 1 according to this embodiment makes it possible to reduce the likelihood of the joint part 20 between the exterior can 10 and the sealing plate 16 being damaged and so enhance the reliability of the power storage device 2 and, ultimately, the power storage module 1. Also, the capacity of the power storage module 1 can be increased, while at the same time maintaining the reliability of the power storage module 1.

Further, the separation area 48 overlaps the entirety of the joint part 20 in the second direction Y in which the sealing plate 16 extends, as viewed in the first direction X. The separation area 48 also overlaps the entirety of the joint part 20 in the direction of thickness of the sealing plate 16. Further, the separation area 48 protrudes away from the sealing plate 16 toward the bottom surface 10a of the exterior can 10. These measures can reduce the load applied to the joint part 20 when the exterior can 10 swells or when the power storage devices 2 are bound by the binding members 8 more successfully than otherwise.

Further, the separator 4 according to this embodiment includes the frame part 24 and the thermal conduction suppression part 26. The frame part 24 defines the hole 42 interposed between two adjacent power storage devices 2 and extending between the two power storage devices 2. Further, the thermal conduction suppression part 26 is provided to block the hole 42. The contact area 46 and the separation area 48 are provided in the frame part 24. By interposing the thermal conduction suppression part 26 between the two adjacent power storage devices 2, it is ensured that, even when the temperature of any given power storage device 2 rises excessively while the power storage module 1 is being used, the heat is inhibited from being conducted to the adjacent power storage device 2. Therefore, a chain reaction of excessive heat is inhibited.

Embodiment 2

Figure 8:
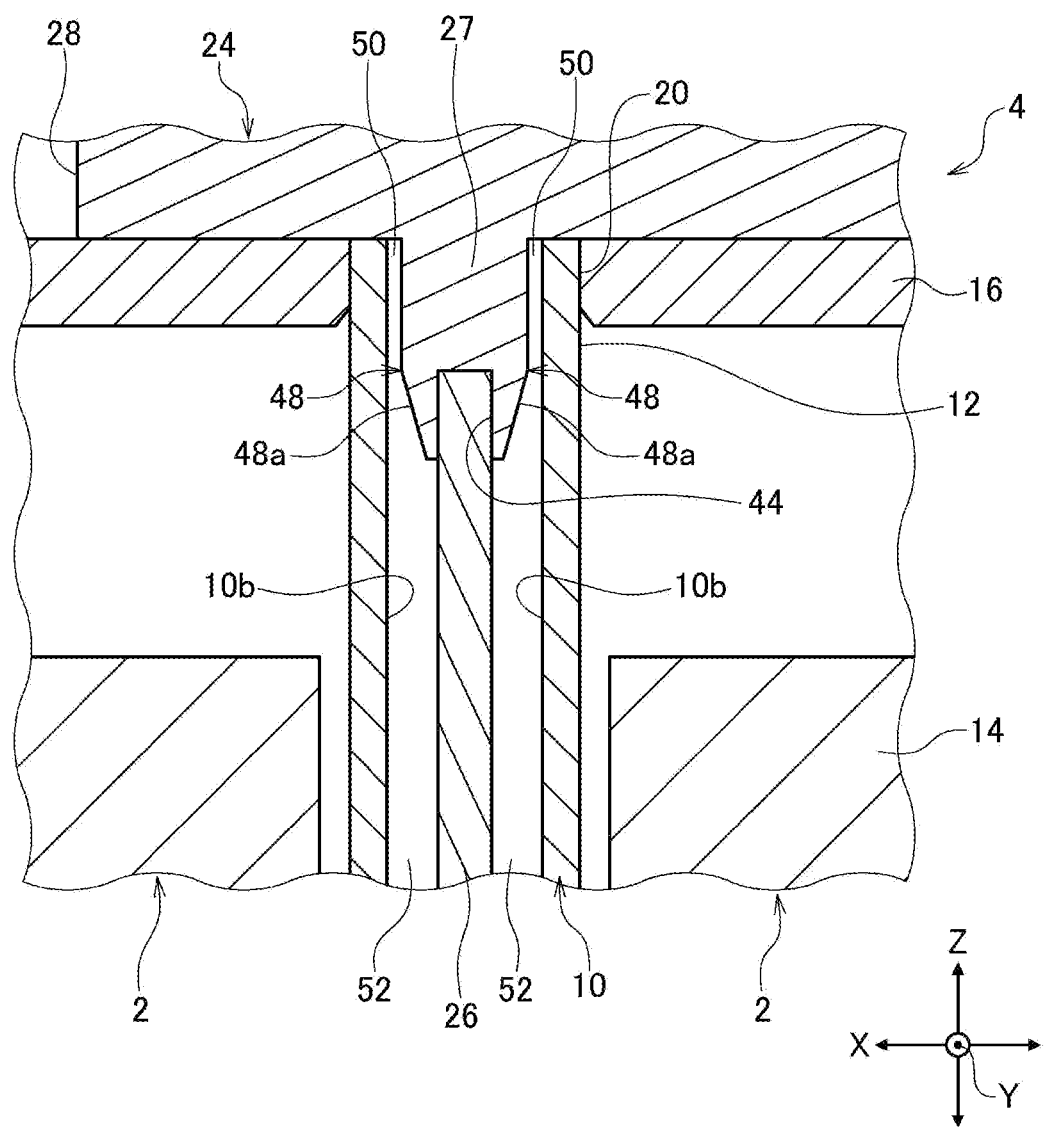
FIG. 8 is a cross-sectional view showing a part of the upper part of the power storage module according to embodiment 2 on an enlarged scale.

Embodiment 2 includes a configuration similar to that of embodiment 1 except for the shape of the frame part 24. The following description of this embodiment highlights features different from those of embodiment 1, and the description of the common features will be simplified or omitted. FIG. 8 is a cross-sectional view showing a part of the upper part of the power storage module according to embodiment 2 on an enlarged scale. FIG. 8 shows the internal structure of the power storage device 2 schematically.

The separator 4 provided in the power storage module 1 according to this embodiment includes the contact area 46 and the separation area 48 as in embodiment 1. The contact area 46 and the separation area 48 are provided in the frame part 24 in this embodiment, too.

The separation area 48 according to this embodiment includes a sloping surface 48a. The sloping surface 48a slopes away from the sealing plate 16 so as to be distanced from the exterior can 10 toward the bottom surface 10a of the exterior can 10 opposite to the sealing plate 16. The sloping surface 48a is provided at the end, toward the hole 42, of the part of the frame part 24 extending along the joint part 20. Therefore, the part of the frame part 24 extending along the joint part 20 has a tapered part having a thickness (the size in the first direction) that is progressively smaller in the inward direction in the power storage module 1.

Therefore, the air gap 50 provided between the separation area 48 and the longer-side lateral surface 10b progressively expands in the inward direction in the power storage module 1 in an area where the sloping surface 48a extends. The amount of swelling of the exterior can 10 is larger toward the central part than toward the peripheral part. By providing the sloping surface 48a in the separation area 48, swelling of the exterior can 10 is more successfully permitted than otherwise. Accordingly, the load applied to the joint part 20 can be reduced more successfully than otherwise. It also reduces the likelihood of the exterior can 10 or the insulating tape, etc. covering the outer surface of the exterior can 10 from receiving a damage such as a dimple as a result of the frame part 24 being pressed against the exterior can 10. The sloping surface 48a may extend over the entirety of the separation area 48 in the third direction Z.

Embodiment 3

When, in the related-art power storage module in which a thermal conduction suppression part is provided between adjacent power storage devices, the amount of swelling of the power storage device increases, the thermal conduction suppression part may be excessively compressed in the direction of arrangement of the power storage devices, and the dimension in the direction of arrangement may be decreased to the extent the thermal conduction path in the direction of arrangement is shortened so that the adiabatic performance drops. A drop in the adiabatic performance of the thermal conduction suppression part could lead to a drop in the reliability of the power storage module and so is desired to be avoided.

Figure 9:
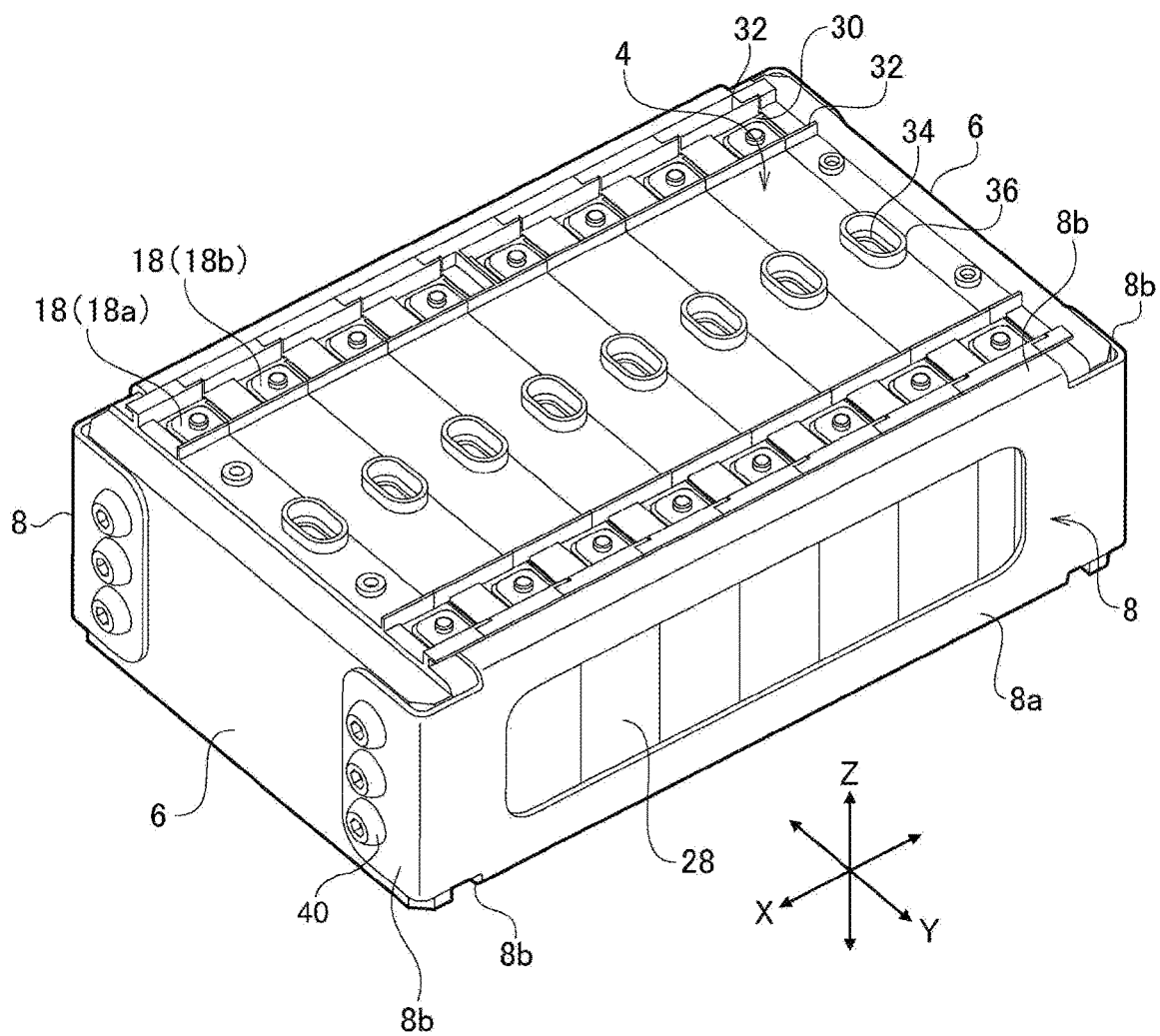
FIG. 9 is a perspective view of a power storage module according to embodiment 3.
Figure 10:
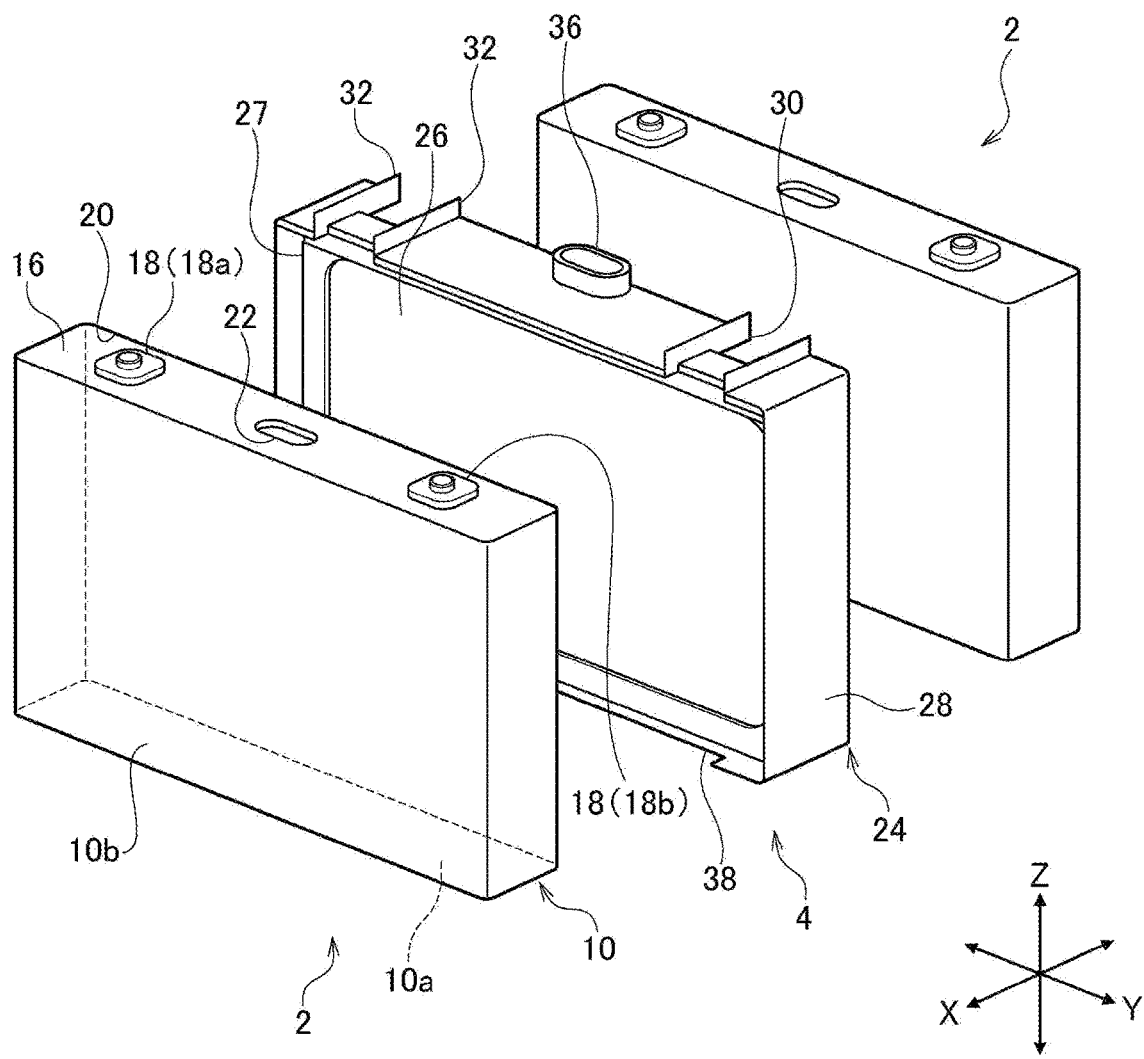
FIG. 10 is an exploded perspective view of a power storage device and a separator.

FIG. 9 is a perspective view of a power storage module according to embodiment 3. FIG. 10 is an exploded perspective view of a power storage device and a separator. The power storage module 1 includes a plurality of power storage devices 2, a plurality of separators 4, a pair of endplates 6, and a pair of binding members 8.

Each power storage device 2 is a rechargeable secondary battery exemplified by a lithium-ion battery, a nickel-hydrogen battery, a nickel-cadmium battery, etc. The power storage device 2 is a so-called rectangular battery and has an exterior can 10 having a flat and cuboid shape. The exterior can 10 has a rectangular opening 12 (see FIG. 13) on one surface. An electrode body 14 (see FIG. 13) including an anode and a cathode, an electrolyte solution, etc. are housed in the exterior can 10 via the opening 12. A sealing plate 16 that blocks the opening 12 to seal the exterior can 10 is provided in the opening 12. The sealing plate 16 is, for example, a rectangular plate.

The exterior can 10 has a bottom surface 10a opposite to the sealing plate 16. Further, the exterior can 10 has four lateral surfaces connecting the opening 12 and the bottom surface 10a. Two of the four lateral surfaces comprise a pair of longer-side lateral surfaces 10b connected to the two longer sides of the opening 12 opposite to each other. Each longer-side lateral surface 10b represents a surface having the largest area among the surfaces of the exterior can 10, i.e., represents the principal surface. The remaining two lateral surfaces excluding the two longer-side lateral surfaces 10b comprise a pair of shorter-side lateral surfaces connected to the shorter sides of the opening 12 of the exterior can 10 and the shorter sides of the bottom surface 10a.

The sealing plate 16 is provided, toward one end in the longitudinal direction, with an output terminal 18 electrically connected to the anode of the electrode body 14 and provided, toward the other end, with an output terminal 18 electrically connected to the cathode of the electrode body 14. Hereinafter, the output terminal 18 connected to the anode will be referred to as an anode terminal 18a, and the output terminal 18 connected to the cathode will be referred to as a cathode terminal 18b as appropriate. When there is no need to distinguish between the polarity of the output terminals 18, the anode terminal 18a and the cathode terminal 18b are generically referred to as the output terminal 18. The exterior can 10 and the sealing plate 16 are conductors and are made of, for example, a metal such as aluminum, iron, and stainless steel. The sealing plate 16 and the exterior can 10 are joined by, for example, a laser. Accordingly, the power storage device 2 has a joint part 20 between the exterior can 10 and the sealing plate 16. By way of one example, the joint part 20 is provided over the entirety of the outer circumference of the sealing plate 16. The sealing plate 16 and the exterior can 10 may be joined by friction stir welding or brazing and soldering instead of a laser.

In the description of this embodiment, the surface provided with the sealing plate 16 is defined as the top surface of the power storage device 2 for convenience. Further, the bottom surface 10a of the exterior can 10 is defined as the bottom surface of the power storage device 2, the longer-side lateral surface 10b of the exterior can 10 is defined as the longer-side lateral surface of the power storage device 2, and the shorter-side lateral surface of the exterior can 10 is defined as the shorter-side lateral surface of the power storage device 2. In the power storage module 1, the surface toward the top surface of the power storage device 2 is defined as the top surface of the power storage module 1, the surface toward the bottom surface of the power storage device 2 is defined as the bottom surface of the power storage module 1, and the surface toward the shorter-side lateral surface of the power storage device 2 is defined as the lateral surface of the power storage module 1. The direction toward the top surface of the power storage module 1 is defined as the upward, vertical direction. The direction toward the bottom surface of the power storage module 1 is defined as the downward, vertical direction. These directions and positions are defined for convenience. Therefore, it does not necessarily mean that the part defined as the top surface in the disclosure is located above the part defined as the bottom surface. Therefore, the sealing plate 16 is not necessarily located above the bottom surface 10a of the exterior can 10.

A safety valve 22 is provided between the pair of output terminals 18 on the sealing plate 16. The safety valve 22 is configured to open to release the gas inside the exterior can 10 when the internal pressure in the exterior can 10 rises to a predetermined value or higher. The safety valve 22 of each power storage device 2 is connected to a gas duct (not shown), and the gas inside the power storage device 2 is discharged to the gas duct from the safety valve 22. The safety valve 22 is comprised of, for example, a thin part provided in a part of the sealing plate 16 and having a smaller thickness than the other parts, and a linear groove formed on the surface inside the thin part. When the internal pressure of the exterior can 10 rises in this configuration, the safety valve 22 opens as the thin part is split around the groove.

A plurality of power storage devices 2 form an assembly by being arranged at predetermined intervals such that the longer-side lateral surfaces 10b of adjacent power storage devices 2 face each other. In this embodiment, the direction in which the plurality of power storage devices 2 are arranged is defined as the first direction X. Further, the direction in which the sealing plate 16 extends is defined as the second direction Y, and the direction in which the sealing plate 16 and the bottom surface 10a are aligned is defined as the third direction Z. The output terminals 18 of the respective power storage devices 2 are arranged to face the same direction. In this embodiment, the output terminals 18 of the respective power storage devices 2 are arranged to face upward in the vertical direction for convenience. Alternatively, the output terminals 18 of the respective power storage devices 2 may be arranged to face different directions.

Two adjacent power storage devices 2 are stacked sch that the anode terminal 18a of one of the power storage device 2 is adjacent to the cathode terminal 18b of the other power storage device 2. The anode terminal 18a and the cathode terminal 18b are connected in series via a bus bar (not shown). The output terminals 18 of the same polarity in a plurality of adjacent power storage devices 2 may be connected in parallel to form a power storage device block, and power storage device blocks may be connected in series.

The separator 4 is also referred to as an insulating separator and is provided between two adjacent power storage devices 2 to insulate the two power storage devices 2 electrically. The separator 4 according to this embodiment includes a frame part 24 and a thermal conduction suppression part 26. The frame part 24 is made of, for example, an insulative resin. The resin forming the frame part 24 is exemplified by a thermoplastic resin such as polypropylene (PP), polybutylene terephthalate (PBT), polycarbonate (PC), and Noryl (registered trademark) resin (modified PPE).

The frame part 24 includes a locking part 27 interposed between the longer-side lateral surfaces 10b of the two adjacent power storage devices 2. The interposing locking part 27 insulates the two adjacent power storage devices 2 from each other. The frame part 24 has a polygonal annular shape (in this embodiment, a rectangular annular shape) corresponding to the shape of the longer-side lateral surface 10b. The inner side of the frame or the annule corresponds to the central side of the power storage module 1 on the YZ plane, and the outer side of the frame or the annule corresponds to the outer side of the power storage module 1 on the YZ plane. The YZ plane is a plane that extends in the second direction Y and in the third direction Z.

Further, the frame part 24 includes a wall part 28. The wall part 28 is connected to the outer circumferential surface of the locking part 27 and extends in the first direction X to cover the top surface, the shorter-side lateral surface, and the bottom surface of the power storage device 2. This ensures a creepage distance between the adjacent power storage devices 2 or between the power storage device 2 and the endplate 6. Further, the position of the power storage device 2 in the second direction Y and the third direction Z can be restricted. Further, the power storage device 2 and the binding member 8 are insulated electrically from each other. In this embodiment, the locking part 27 and the wall part 28 are formed integrally.

A notch 30 is provided at a position of the wall part 28 corresponding to the output terminal 18 so as to expose the output terminal 18. The wall part 28 is also provided with a pair of protruding wall parts 32 that protrude in the third direction Z in which the sealing plate 16 and the bottom surface 10a are aligned. The pair of protruding wall parts 32 are arranged to sandwich the notch 30 in the second direction Y in which the sealing plate 16 extends, i.e., the second direction Y in which the two output terminals 18 are arranged.

An opening 34 is provided at a position of the wall part 28 corresponding to the safety valve 22 to expose the safety valve 22. A cylindrical duct part 36 that protrudes from the wall part 28 in the third direction Z is provided around the opening 34. The duct part 36 encircles the entirety of the opening 34. The duct part 36 connects the safety valve 22 and the gas duct (not shown). A notch 38 is provided at a position of the wall part 28 corresponding to the bottom surface 10a of the exterior can 10 to expose a part of the bottom surface 10a. By way of example, a cooling plate is thermally coupled to the bottom surface 10a of the power storage device 2.

The thermal conduction suppression part 26 is interposed between the longer-side lateral surfaces 10b of the two adjacent power storage devices 2 to suppress thermal conduction between the two power storage devices 2. Even when the temperature of any given power storage device 2 rises excessively while the power storage module 1 is being used, the heat is inhibited from being conducted to the adjacent power storage device 2. Therefore, a chain reaction of excessive heat (a chain reaction of thermal runaway) is inhibited. The thermal conduction suppression part 26 is also insulative. The thermal conduction suppression part 26 is shaped in a plate or a sheet. By way of example, the thermal conduction suppression part 26 is made of an adiabatic member and a laminated film. For example, the thickness of the thermal conduction suppression part 26 is 1-2 mm.

The adiabatic member is shaped in a sheet and has a structure in which a porous member such as silica xerogel is supported between fibers of a fibrous sheet of non-woven fabric, etc. Silica xerogel has a nanosized void structure that restricts movement of air molecules and has a low thermal conductivity. The thermal conductivity of the adiabatic member is about 0.018-0.024 W/m·K. The adiabatic member is especially useful as an adiabatic member used in a narrow space. The thermal conductivity of the adiabatic member is lower than the thermal conductivity of air. By providing the thermal conduction suppression part 26, therefore, it is possible to suppress thermal conduction between the two adjacent power storage devices 2 more successfully than when only an air layer is interposed between the power storage devices 2. The thermal conduction suppression part 26 has a lower thermal conductivity than the frame part 24.

Further, silica xerogel has a relatively high structural stability in the presence of an external pressure. For this reason, the adiabatic performance of the adiabatic member can be maintained in a stable manner. Therefore, thermal conduction between the power storage devices 2 can be suppressed in a more stable manner by providing the thermal conduction suppression part 26 in the power storage module 1. Further, the adiabatic member has a lower thermal conductivity than air so that it is possible to obtain an equivalent adiabatic effect with a layer thickness smaller than that of an air layer. Accordingly, the size of the power storage module 1 is inhibited from being increased.

A laminated film is a member for covering and protecting the entirety of the adiabatic member. With a laminated film, it is possible to inhibit the porous member in the adiabatic member from being dislodged from the fibrous sheet. Further, covering the adiabatic member with a laminated film makes it easier to set the thermal conduction suppression part 26 in the frame part 24 when the power storage module 1 is assembled. The laminated film is made of, for example, polyethylene terephthalate (PET), etc.

The thermal conduction suppression part 26 has a higher heat resistance than the frame part 24. To be more specific, the heat resistance of the adiabatic member is higher than the heat resistance of the frame part 24. To be even more specific, the fibrous sheet includes fibers having a higher melting point than the frame part 24, or the porous member is made of a substance having a higher melting point than the frame part 24, or both. For example, the melting point of the adiabatic member is 300° C. or higher. To be more specific, the melting point of the fibrous sheet and/or the porous material forming the adiabatic member is 300° C. or higher. Particularly, it is preferable that the melting point of the fibers forming the fibrous sheet be 300° C. or higher. This can maintain a state in which the fibrous sheet supports the porous material even when the adiabatic member is exposed to a higher temperature.

By configuring the heat resistance of the thermal conduction suppression part 26 to be higher than the heat resistance of the frame part 24, it is ensured that the thermal conduction suppression part 26 remains even when the frame part 24 is melted by the heat generated in the power storage device 2. Thus, the thermal conduction suppression part 26 can maintain insulation between the power storage devices 2 even when the frame part 24 is melted. Further, the state in which thermal conduction between adjacent power storage devices 2 is suppressed can be maintained for a longer period of time than otherwise.

The plurality of power storage devices 2 and the plurality of separators 4 arranged side by side are sandwiched by the pair of endplates 6 in the first direction X. For example, a separator in which the thermal conduction suppression part 26 is not assembled is provided between the pair of endplates 6 and the power storage devices 2 located at the respective ends in the first direction X. This insulates the power storage devices 2 and the endplates 6 electrically and avoids heat dissipation from the power storage devices 2 via the endplates 6 from being obstructed. Preferably, the separator includes a separation area 48 described later. The endplate 6 is formed by, for example, a metal plate. The surface of the endplate 6 facing the longer-side lateral surface 10b of the exterior can 10 is provided with a screw hole (not shown) threadably engaged with a screw 40.

The pair of binding members 8 are also called binding bars and are elongated members with the first direction X being defined as the longitudinal direction. The pair of binding members 8 are arranged in the second direction Y in which the pair of output terminals 18 are arranged so as to face each other. The plurality of power storage devices 2, the plurality of separators 4, and the pair of endplates 6 are interposed between the pair of binding members 8. Each binding member 8 has a rectangular flat part 8a extending parallel to the shorter-side lateral surface of the power storage device 2 and four peak parts 8b protruding from the respective edges of the flat part 8a toward the power storage device 2. The two peak parts 8b opposite to each other in the first direction X are provided with through holes (not shown) in which the screw 40 is inserted.

The plurality of power storage devices 2, the plurality of separators 4 and the pair of endplates 6 are sandwiched by the pair of binding members 8 in the second direction Y such that the plurality of power storage devices 2 and the plurality of separators 4 are arranged alternately and are sandwiched by the pair of endplates 6 in the first direction X. Each binding member 8 is positioned such that the through hole of the peak part 8b is aligned with the screw hole of the endplate 6. The screw 40 is inserted into the through hole and threadably engaged with the screw hole. In this way, the pair of binding members 8 are engaged with the pair of endplates 6 to bind the plurality of power storage devices 2. The plurality of power storage devices 2 and the plurality of separators 4 are fastened by the binding members 8 such that a predetermined pressure is applied in the first direction X.

The plurality of power storage devices 2 are positioned in the first direction X by being fastened by the binding members 8 in the first direction X. The top surfaces and the bottom surfaces of the plurality of power storage devices 2 come into contact with the two peak parts 8b opposite to each other in the third direction Z in which the top surfaces and the bottom surfaces are aligned, via the wall part 28 of the separator 4. In this way, the plurality of power storage devices 2 are positioned in the third direction Z. By way of example, a bus bar is attached to the output terminal 18 of each power storage device 2 once the power storage devices 2 are positioned so that the output terminals 18 of the plurality of power storage devices 2 are connected to each other electrically. For example, the bus bar is fixed to the output terminal 18 by welding.

The top surfaces of the plurality of power storage devices 2 are covered by a cover member (not shown). The cover member is supported by the protruding wall part 32. The cover member prevents contact of dew condensation water, dust, etc. with the output terminals 18, the bus bar, the safety valve 22, etc. of the power storage device 2. The cover member is made of, for example, an insulative resin.

Figure 11:
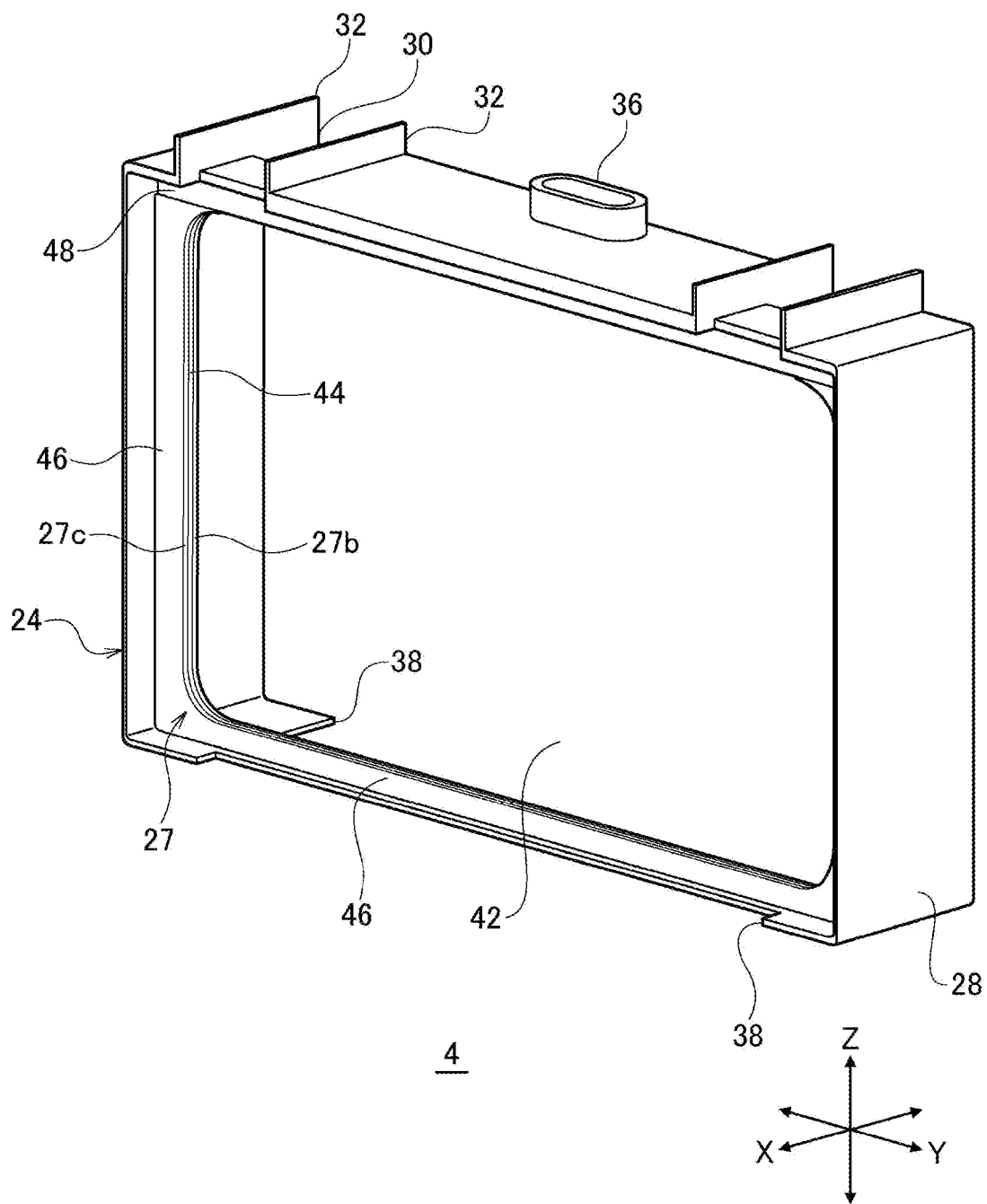
FIG. 11 is a perspective view of the separator.
Figure 12:
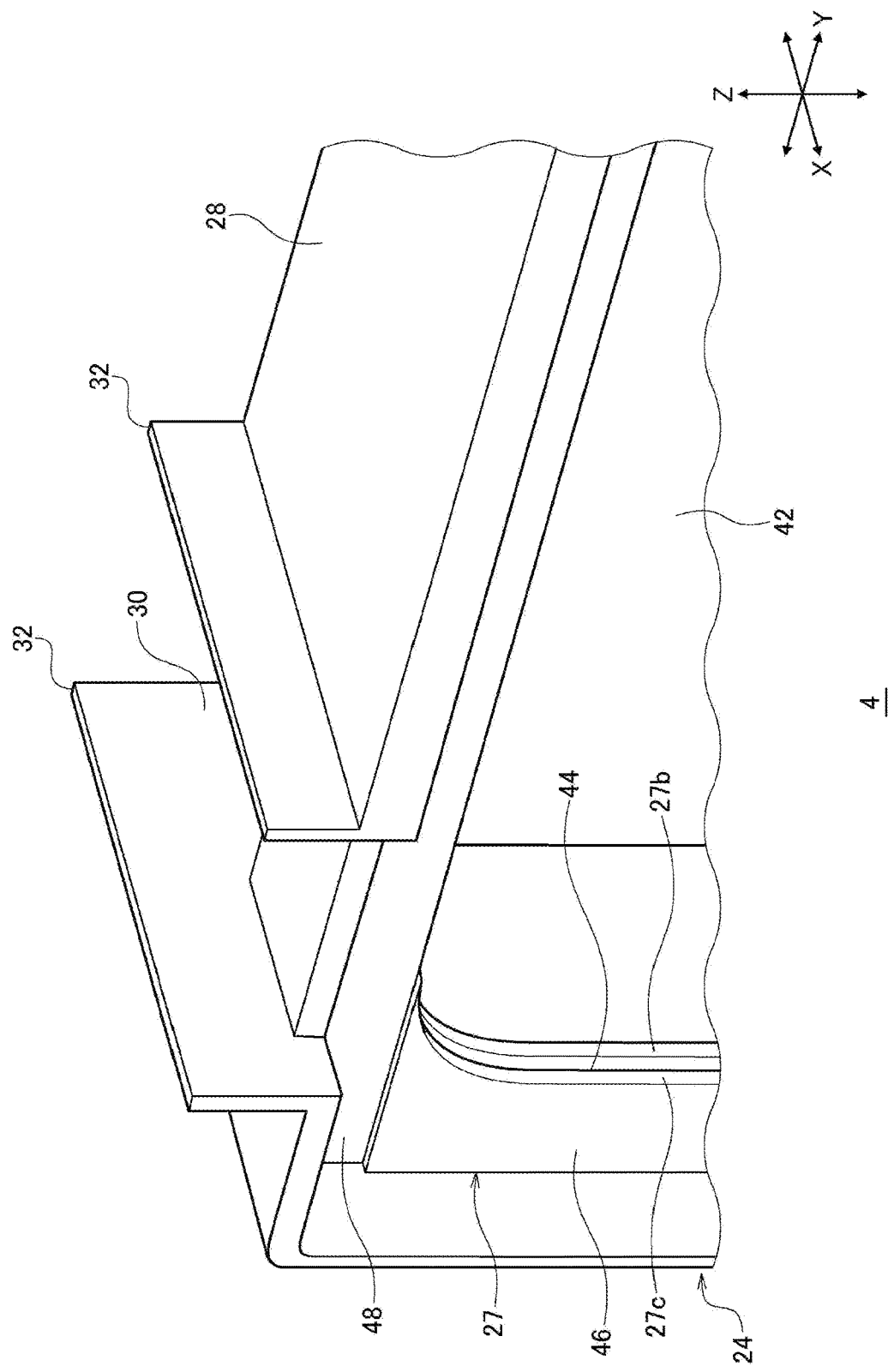
FIG. 12 is a perspective view showing a part of the separator on an enlarged scale.
Figure 13:
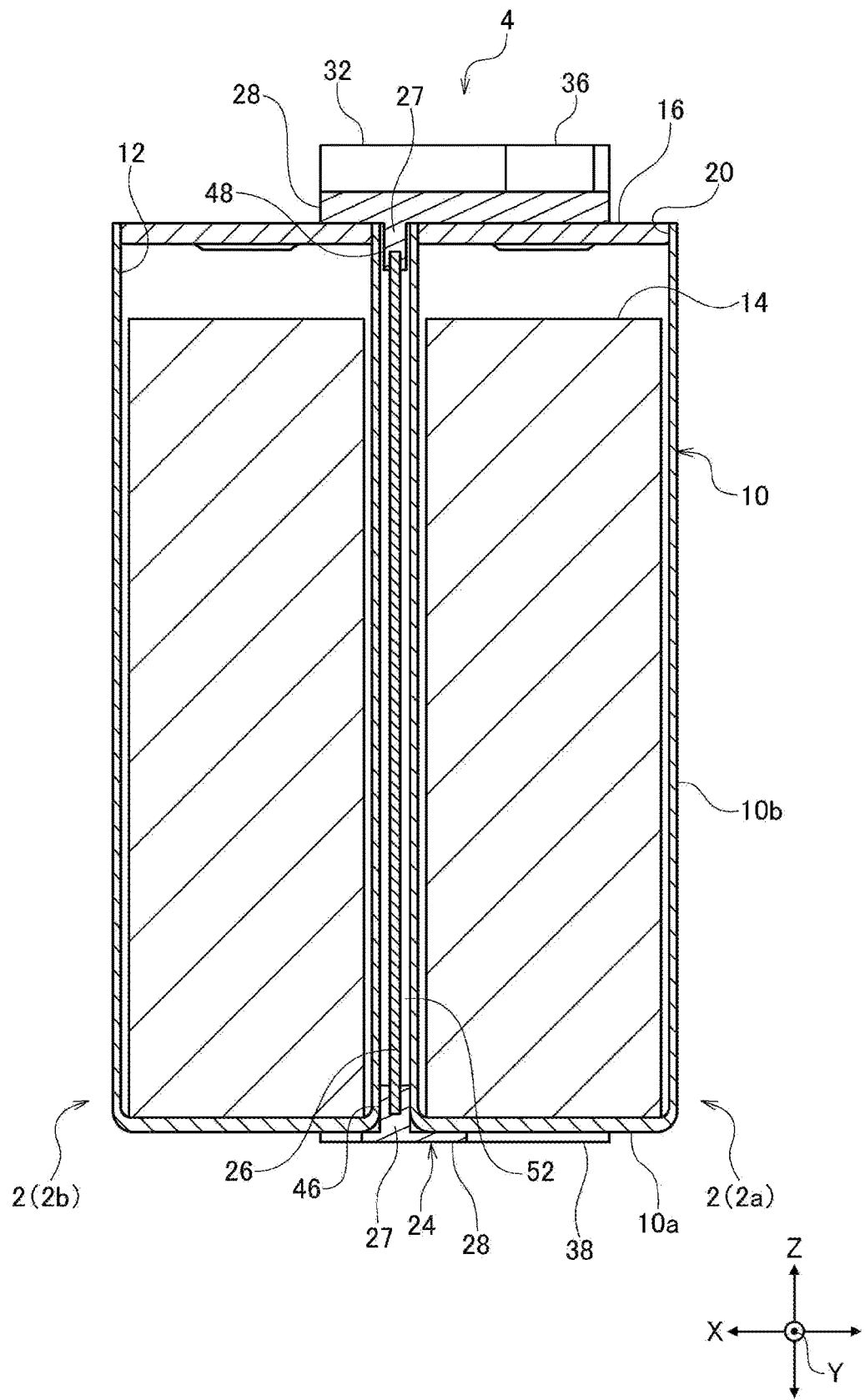
FIG. 13 is a cross-sectional view of a part of the power storage module.
Figure 14:
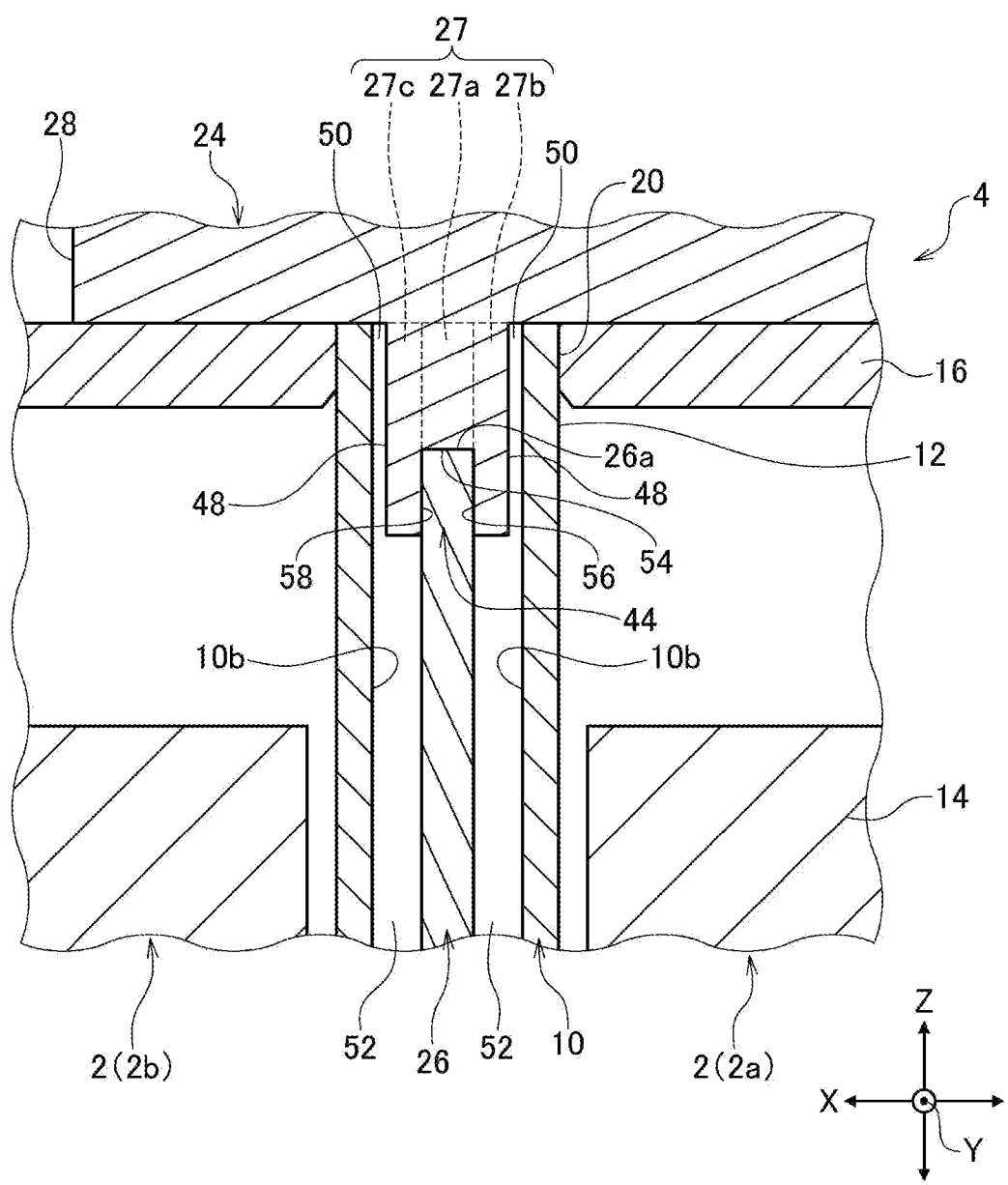
FIG. 14 is a cross-sectional view of a part of the upper part of the power storage module on an enlarged scale.
Figure 15:
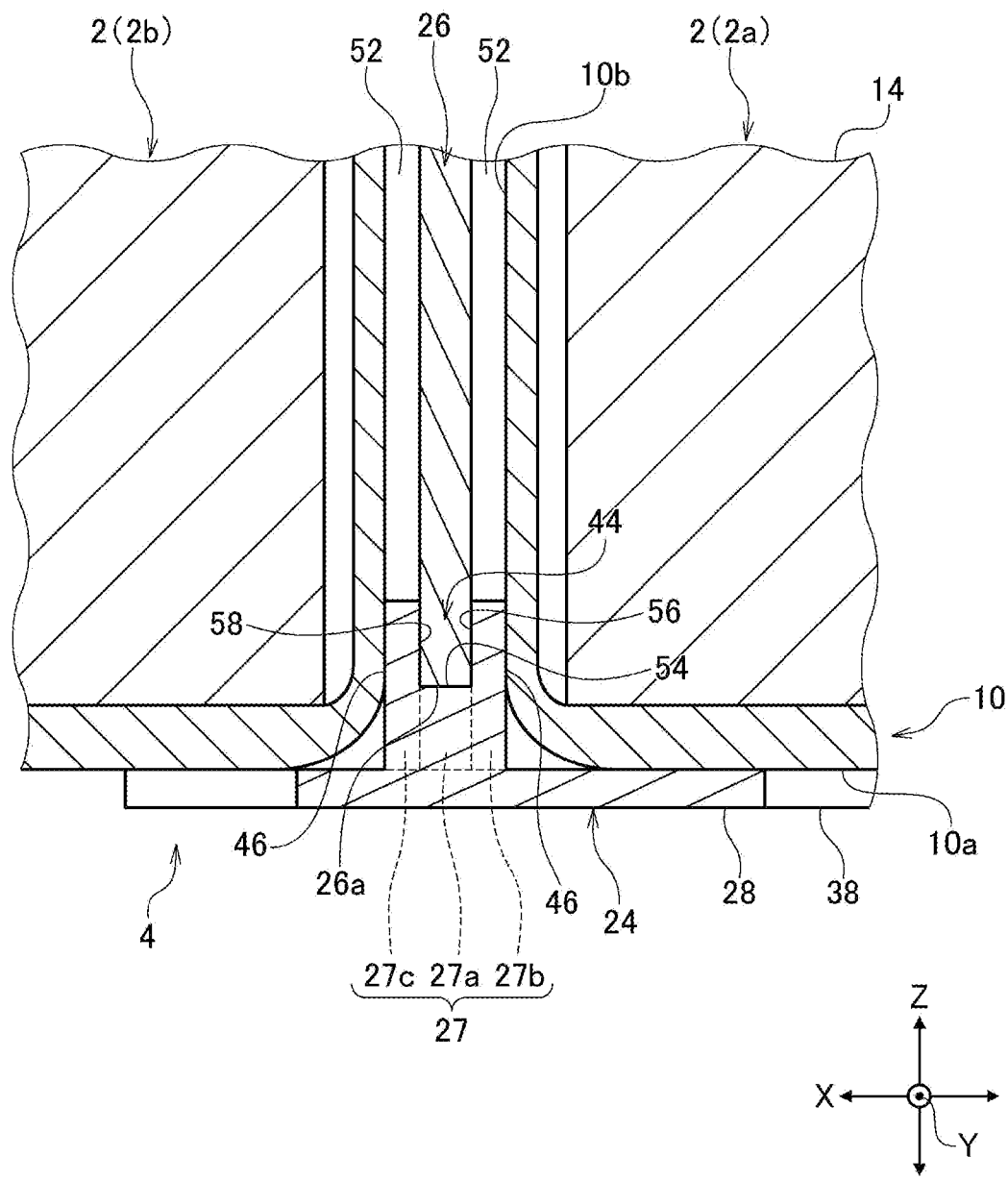
FIG. 15 is a cross-sectional view showing a part of the lower part of the power storage module on an enlarged scale.

FIG. 11 is a perspective view of the separator. FIG. 12 is a perspective view showing a part of the separator on an enlarged scale. FIG. 13 is a cross-sectional view of a part of the power storage module. FIG. 14 is a cross-sectional view of a part of the upper part of the power storage module on an enlarged scale. FIG. 15 is a cross-sectional view showing a part of the lower part of the power storage module on an enlarged scale. In FIG. 11 and FIG. 12, illustration of the thermal conduction suppression part 26 is omitted. The plurality of power storage devices 2 provided in the power storage module 1 include a first power storage device 2a and a second power storage device 2b adjacent to each other. FIGS. 13-15 show, as a part of the power storage module 1, the first power storage device 2a, the second power storage device 2b, and the separator 4 provided therebetween. Hereinafter, when there is no need to distinguish between the first power storage device 2a and the second power storage device 2b, they are generically referred to as the power storage device 2. FIGS. 13-15 show the internal structure of each power storage device 2 schematically.

The separator 4 is provided between the first power storage device 2a and the second power storage device 2b arranged in the first direction X to insulate the two power storage devices 2 electrically. Further, as described above, the separator 4 includes the frame part 24 and the thermal conduction suppression part 26. The locking part 27 of the frame part 24 includes a hole 42 interposed between the first power storage device 2a and the second power storage device 2b and extending between the two power storage devices 2. Further, the frame part 24 extends along the peripheral part of the exterior can 10 as viewed in the first direction X in which the power storage devices 2 are arranged. Therefore, the hole 42 is aligned with the central part of the exterior can 10 as viewed in the first direction X. Stated otherwise, the hole 42 is a through hole extending through the separator 4 in the first direction X.

The thermal conduction suppression part 26 is provided to block the hole 42. The locking part 27 of the frame part 24 has a predetermined thickness in the first direction X and has a groove part 44 on the inner circumferential surface of the frame part 24 facing the hole 42. The groove part 44 extends over the entirety of the hole 42. The thermal conduction suppression part 26 is supported by the frame part 24 such that the peripheral part thereof is fitted in the groove part 44. The groove part 44 may not extend over the entirety of the hole 42. For example, the groove part 44 may be formed only at both ends of the thermal conduction suppression part 26 to support the ends of the thermal conduction suppression part 26.

The frame part 24 of this embodiment includes the locking part 27 as a structure for locking the thermal conduction suppression part 26. The locking part 27 includes a first part 27a, a second part 27b, and a third part 27c. Further, the groove part 44 is defined by the first part 27a, the second part 27b, and the third part 27c. More specifically, the first part 27a-the third part 27c are shaped in a frame, and the second part 27b, the first part 27a, and the third part 27c are arranged in the stated order in the first direction X. In other words, the first part 27a is sandwiched by the second part 27b and the third part 27c in the first direction X.

Further, the second part 27b is provided between the first part 27a and the first power storage device 2a, and the third part 27c is provided between the first part 27a and the second power storage device 2b. In this embodiment, the first part 27a, the second part 27b, and the third part 27c are integrally molded. Further, the outer circumferential surface of each of the first part 27a-the third part 27c is connected to the inner circumferential surface of the wall part 28. The height of protrusion of the second part 27b and the third part 27c from the inner circumferential surface of the wall part 28 is larger than that of the first part 27a.

Therefore, the bottom surface of the groove part 44 is formed by an inner circumferential surface 54 of the first part 27a. Further, one lateral surface of the groove part 44 is formed by an area on a lateral surface 56 of the second part 27b facing the second power storage device 2b that protrudes away from the inner circumferential surface 54 toward the inside area of the frame part 24. Further, the other lateral surface of the groove part 44 is formed by an area on a lateral surface 58 of the third part 27c facing the first power storage device 2a that protrudes away from the inner circumferential surface 54 toward the inside area of the frame part 24. The height of protrusion of the first part 27a may be 0. In other words, the area on the inner circumferential surface of the wall part 28 sandwiched by the second part 27b and the third part 27c may form the first part 27a.

The first part 27a comes into contact with the a surface 26a of the thermal conduction suppression part 26 facing a direction intersecting the first direction X. The surface 26a is a surface of the thermal conduction suppression part 26 facing away from the frame part 24 or a surface of the thermal conduction suppression part 26 extending in the first direction X. Further, the second part 27b is interposed between the thermal conduction suppression part 26 and the first power storage device 2a. In other words, the second part 27b is sandwiched by the peripheral part of the thermal conduction suppression part 26 and the peripheral part of the exterior can 10 of the first power storage device 2a. Further, the third part 27c is interposed between the thermal conduction suppression part 26 and the second power storage device 2b. In other words, the third part 27c is sandwiched by the peripheral part of the thermal conduction suppression part 26 and the peripheral part of the exterior can 10 of the second power storage device 2b.

In this way, an air gap 52 is formed between the central part of the thermal conduction suppression part 26 and the central part of each exterior can 10 by interposing the second part 27b and the third part 27c between the peripheral part of the thermal conduction suppression part 26 and the peripheral part of the exterior can 10 of each adjacent power storage device 2. By providing the air gap 52, the central part of the exterior can 10 swells without coming into contact with the thermal conduction suppression part 26 at least in the initial stage of swelling of the exterior can 10. In other words, the air gap 52 functions as a space that permits swelling of the exterior can 10 by a certain amount. This reduces the amount of compression, in the first direction X, of the thermal conduction suppression part 26 due to the swelling of each exterior can 10. Consequently, the adiabatic performance of the thermal conduction suppression part 26 is inhibited from dropping. It also reduces the load applied to the endplate 6 and the binding member 8 due to the pressure from the swollen part of the exterior can 10 applied to the endplate 6 and the binding member 8.

An elastic body (not shown) may be interposed in place of the air gap 52 between the thermal conduction suppression part 26 and the power storage device 2 adjacent to the thermal conduction suppression part 26. The elastic body is, for example, a member having a lower coefficient of elasticity than the thermal conduction suppression part 26. In this case, the elastic body is compressed in preference to the thermal conduction suppression part 26 when the power storage device 2 swells. This inhibits the thermal conduction suppression part 26 from being excessively compressed and plastically deformed by the swollen power storage device 2. In the case the thermal conduction suppression part 26 is interposed between two power storage devices 2, the elastic body may be provided to sandwich the thermal conduction suppression part 26 in a sheet shape. Alternatively, the elastic body may be interposed between the contact area 46 of the separator 4 and the power storage device 2 as well as between the thermal conduction suppression part 26 and the power storage device 2.

The locking part 27 of this embodiment includes both the second part 27b and the third part 27c. Alternatively, the locking part 27 may include only the second part 27b as in variation 1 described later. By causing the locking part 27 to include the second part 27b, the air gap 52 can be provided at least between the thermal conduction suppression part 26 and the exterior can 10 of the first power storage device 2a. This air gap 52 permits swelling of the exterior can 10 of the first power storage device 2a. Further, when the exterior can 10 of the second power storage device 2b swells, the thermal conduction suppression part 26 is pressed toward the first power storage device 2a, but the thermal conduction suppression part 26 can be displaced in the air gap 52 toward the first power storage device 2a. Therefore, the amount of compression of the thermal conduction suppression part 26 due to the swelling of the each exterior can 10 can be reduced even if the frame part 24 does not include the third part 27c.

The method to install the thermal conduction suppression part 26 in the frame part 24, i.e., the method of assembling the separator 4 is exemplified by the following method. For example, the frame part 24 is divided into a plurality of (e.g., two) pieces in the second direction Y or the third direction Z. The pieces are arranged to sandwich the thermal conduction suppression part 26, and the ends of the thermal conduction suppression part 26 are positioned in the groove parts 44 of the respective pieces, and, afterwards, the pieces are brought closer to each other. After the pieces abut each other, the pieces are fixed by, for example, adhesion. This causes the peripheral parts of the thermal conduction suppression part 26 to be inserted into the groove parts 44 and supported by the frame part 24. Alternatively, a slit for inserting the thermal conduction suppression part 26 into the hole 42 may be provided in the frame part 24, and the thermal conduction suppression part 26 may be inserted into the frame part 24 via the slit. Alternatively, the frame part 24 may be divided in the first direction X, and the separator 4 may be assembled by causing the respective pieces to sandwich the thermal conduction suppression part 26 in the first direction X. Alternatively, the separator 4 may be formed by integrally molding the frame part 24 and the thermal conduction suppression part 26.

Further, the separator 4 includes a contact area 46 and an separation area 48. In this embodiment, the contact area 46 and the separation area 48 are provided in the frame part 24. More specifically, the contact area 46 and the separation area 48 are arranged on the lateral surface of the second part 27b facing the first power storage device 2a and the lateral surface of the third part 27c facing the second power storage device 2b. The contact area 46 abuts the surface of each exterior can 10 facing the first direction X, i.e., the longer-side lateral surface 10b. This positions each power storage device 2 in the first direction X. It also suppresses swelling of the exterior can 10. The contact area 46 of this embodiment comes into contact with three edge parts including an edge part of the longer-side lateral surface 10b adjacent to the bottom surface 10a and edge parts adjacent to the pair of shorter-side lateral surfaces. Therefore, the contact area 46 is substantially U-shaped as viewed in the first direction X.

The separation area 48 has a shape concaved with respect to the contact area 46 in the direction away from the exterior can 10. The separation area 48 is provided to overlap the joint part 20 as viewed in the first direction X. The longer-side lateral surface 10b of this embodiment is rectangular. The contact area 46 overlaps three of the four edges of the longer-side lateral surface 10b facing the first direction X, and the separation area 48 overlaps the remaining edge of the four sides.

An air gap 50 is provided between the separation area 48 of the frame part 24 and the longer-side lateral surface 10b of the exterior can 10. By providing the frame part 24 with the separation area 48, it is possible to avoid the joint part 20 from being pressured by the frame part 24 when the power storage module 1 is assembled. This reduces the load applied by the pressure from the separator 4 to the joint part 20 when the power storage module 1 is assembled. The separation area 48 may be provided to extend intermittently in the second direction Y or the third direction Z.

The neighborhood of the joint part 20 in the exterior can 10 swells without being pressured by the frame part 24 in the initial stage of swelling of the exterior can 10. When the exterior can 10 has swollen by a certain amount, the exterior can 10 comes into contact with the separation area 48, inhibiting further swelling of the exterior can 10. This inhibits excessive deformation of the joint part 20. As a result, the load applied to the joint part 20 by the deformation is reduced.

The separation area 48 of this embodiment extends over the entirety of the locking part 27 in the second direction Y in which the sealing plate 16 extends. In other words, the ends of the separation area 48 in the second direction Y come into contact with the wall part 28 extending parallel to the shorter-side lateral surface of the power storage device 2. Therefore, the separation area 48 overlaps the entirety of the joint part 20 in the second direction Y in which the sealing plate 16 extends, as viewed in the first direction X. This reduces the load applied to the joint part 20 more successfully than otherwise. The ends of the separation area 48 in the second direction Y may be connected to the part of the contact area 46 extending in the third direction Z. This enhances the mechanical strength of the frame part 24 and enhances the reliability related to the retention of the power storage device 2.

The separation area 48 also overlaps the entirety of the joint part 20 in the direction of thickness of the sealing plate 16, i.e., the third direction Z. Stated otherwise, the separation area 48 extends from the surface of the sealing plate 16 facing away from the power storage device 2 toward the surface facing the interior space of the power storage device 2. This reduces the load applied to the joint part 20 more successfully than otherwise. Further, the separation area 48 protrudes away from the sealing plate 16 toward the surface of the exterior can 10 opposite to the sealing plate 16, i.e., toward the bottom surface 10a. In other words, the separation area 48 extends toward the bottom surface 10a beyond the surface of the sealing plate 16 facing the interior space of the power storage device 2. This also reduces the load applied to the joint part 20 more successfully than otherwise.

In further accordance with this embodiment, the part of the frame part 24 extending along the joint part 20, i.e., the part where the separation area 48 is provided, is provided outside the electrode body 14 as viewed in the first direction X. Swelling of the exterior can 10 is mainly caused by swelling of the electrode body 14. By providing that part of the frame part 24 outside the electrode body 14, therefore, the separation area 48 does not overlap the electrode body 14, and the load applied to the joint part 20 is more successfully reduced than otherwise.

As described above, the power storage module 1 according to this embodiment includes the first power storage device 2a and the second power storage device 2b arranged in the first direction X, and the separator 4 provided between the first power storage device 2a and the second power storage device 2b and insulating the two power storage devices 2 from each other. The separator 4 includes the frame part 24 and the thermal conduction suppression part 26. The frame part 24 includes: the hole 42 interposed between the first power storage device 2a and the second power storage device 2b and extending between the two power storage devices 2; and the locking part 27 for locking the thermal conduction suppression part 26. The thermal conduction suppression part 26 is provided to block the hole 42 and is supported by the frame part 24. The locking part 27 includes: the first part 27a that comes into contact with the surface 26a of the thermal conduction suppression part 26 facing the direction intersection the first direction X; and the second part 27b interposed between the thermal conduction suppression part 26 and the first power storage device 2a.

By interposing the second part 27b between the thermal conduction suppression part 26 and the first power storage device 2a, the air gap 52 is formed between the thermal conduction suppression part 26 and the first power storage device 2a. To describe it in further detail, the second part 27b is inserted between the peripheral part of the thermal conduction suppression part 26 and the peripheral part of the first power storage device 2a. Therefore, the air gap 52 is more properly formed between the central part of the thermal conduction suppression part 26 and the central part of the first power storage device 2a than otherwise.

This inhibits the thermal conduction suppression part 26 from being compressed in the first direction X due to the swelling of the first power storage device 2a and/or the second power storage device 2b adjacent to the separator 4. As a result, the variation in the thickness of the thermal conduction suppression part 26 in the first direction X is decreased so that the adiabatic performance of the thermal conduction suppression part 26 is inhibited from dropping. As described above, the reliability of the power storage module 1 is inhibited from dropping according to this embodiment. Also, the capacity of the power storage module 1 can be increased, while at the same time maintaining the reliability of the power storage module 1.

Further, by providing the air gap 52 to permit swelling of the power storage device 2 by a certain amount, the load applied to the endplate 6 and the binding member 8 is reduced. This makes it possible to avoid increasing the strength of the endplate 6 or the binding member 8 to counter an increase in the amount of swelling of the power storage device 2. Consequently, the cost of the power storage module 1 is inhibited from increasing, and the workability of the endplate 6 or the binding member 8 is inhibited from dropping. The size of the air gap 52 in the first direction X may be equal to or larger than the size of the air gap 50 in the first direction X. This secures a space in which the exterior can 10 swells while at the same time providing the separation area 48.

Further, the locking part 27 of this embodiment includes the third part 27c interposed between the thermal conduction suppression part 26 and the second power storage device 2b. This forms the air gap 52 between the thermal conduction suppression part 26 and the second power storage device 2b as well as between the thermal conduction suppression part 26 and the first power storage device 2a. To describe it in further detail, the third part 27c is inserted between the peripheral part of the thermal conduction suppression part 26 and the peripheral part of the second power storage device 2b. Therefore, the air gap 52 is more properly formed between the central part of the thermal conduction suppression part 26 and the central part of the second power storage device 2b than otherwise. This further inhibits compression of the thermal conduction suppression part 26 due to the swelling of the first power storage device 2a and/or the second power storage device 2b. As a result, the reliability of the power storage module 1 is further inhibited from dropping.

Further, the power storage device 2 of this embodiment includes the exterior can 10 having the opening 12, the sealing plate 16 that blocks the opening 12, and the joint part 20 between the exterior can 10 and the sealing plate 16. The frame part 24 includes: the contact area 46 that abuts the surface of the exterior can 10 facing the first direction X; and the separation area 48 overlapping the joint part 20 as viewed in the first direction X and concaved with respect to the contact area 46 in the direction away from the exterior can 10.

Providing the separator 4 with the separation area 48 reduces the load applied to the joint part 20 when the plurality of power storage devices 2 and the plurality of separators 4 are compressed in the first direction X and bound by the binding members 8 to assemble the power storage module 1. It also reduces the load repeatedly applied to the joint part 20 when the exterior can 10 swells.

Further, when the exterior can 10 has swollen to a certain size, the exterior can 10 comes into contact with the separation area 48, inhibiting further swelling of the exterior can 10. This inhibits excessive deformation of the joint part 20 and reduces the load applied to the joint part 20 due to the deformation. Accordingly, the power storage module 1 according to this embodiment makes it possible to reduce the likelihood of the joint part 20 between the exterior can 10 and the sealing plate 16 being damaged and so enhance the reliability of the power storage device 2 and, ultimately, the power storage module 1.

Further, the separation area 48 overlaps the entirety of the joint part 20 in the second direction Y in which the sealing plate 16 extends, as viewed in the first direction X. The separation area 48 also overlaps the entirety of the joint part 20 in the direction of thickness of the sealing plate 16. Further, the separation area 48 protrudes away from the sealing plate 16 toward the bottom surface 10a of the exterior can 10. These measures can reduce the load applied to the joint part 20 when the exterior can 10 swells or when the power storage devices 2 are bound by the binding members 8 more successfully than otherwise.

Embodiment 4

Figure 16:
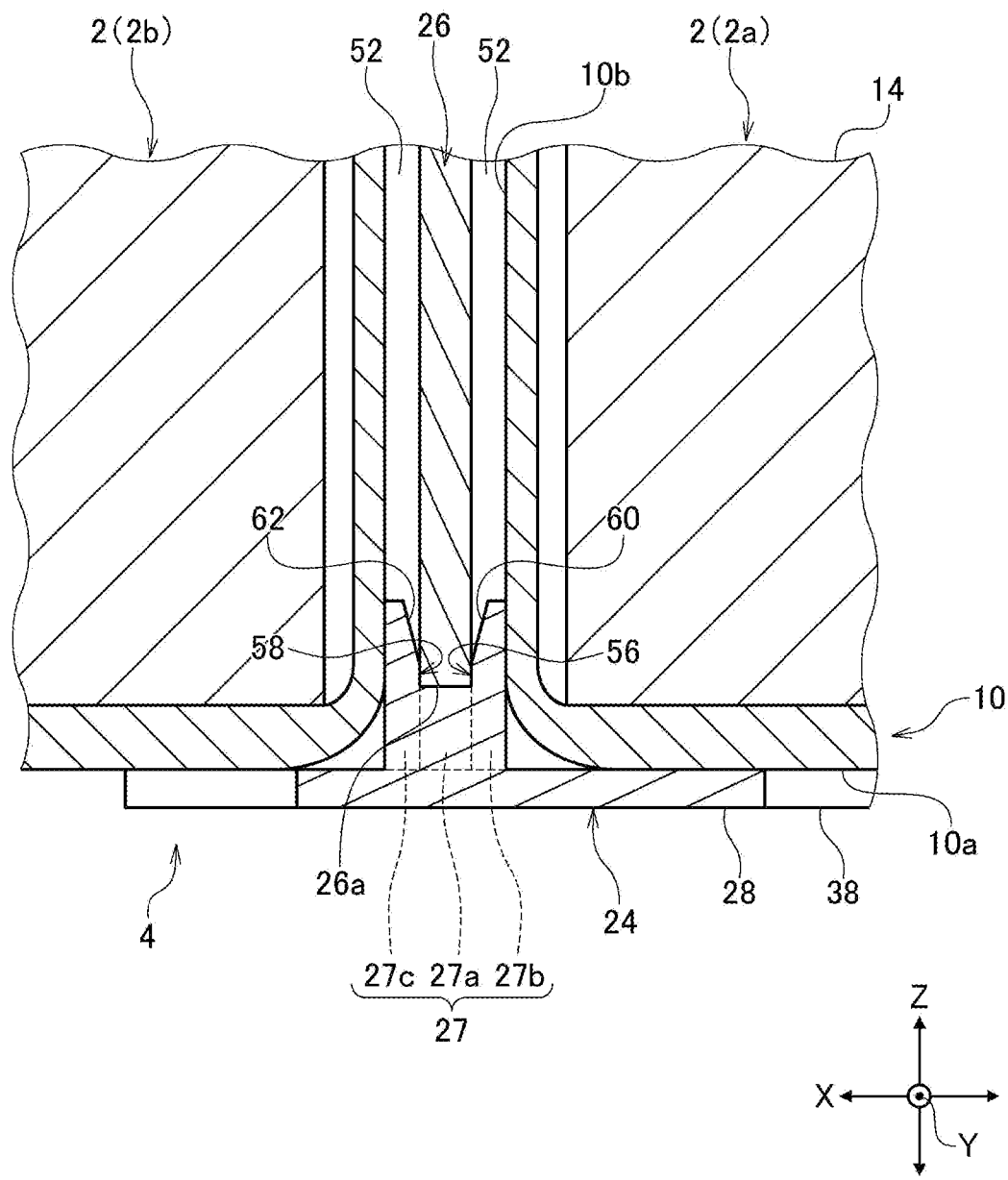
FIG. 16 is a cross-sectional view showing a part of the lower part of the power storage module according to embodiment 4 on an enlarged scale.

Embodiment 4 includes a configuration similar to that of embodiment 3 except for the shape of the frame part 24. The following description of this embodiment highlights features different from those of embodiment 3, and the description of the common features will be simplified or omitted. FIG. 16 is a cross-sectional view showing a part of the lower part of the power storage module according to embodiment 4 on an enlarged scale. FIG. 16 shows the internal structure of the power storage device 2 schematically.

The separator 4 provided in the power storage module 1 according to this embodiment includes the frame part 24 and the thermal conduction suppression part 26 as in embodiment 3. The frame part 24 includes: the hole 42 interposed between the first power storage device 2a and the second power storage device 2b and extending between the two power storage devices 2; and the locking part 27 for locking the thermal conduction suppression part 26. The locking part 27 includes a first part 27a, a second part 27b, and a third part 27c. The thermal conduction suppression part 26 is provided to block the hole 42 and is supported by the frame part 24. The first part 27a comes into contact with a surface 26a of the thermal conduction suppression part 26 facing a direction intersecting the first direction X. The second part 27b is interposed between the thermal conduction suppression part 26 and the first power storage device 2a. The third part 27c is interposed between the thermal conduction suppression part 26 and the second power storage device 2b.

Further, the second part 27b of this embodiment has a first sloping surface 60 on the side facing the thermal conduction suppression part 26, i.e., on the lateral surface 56 of the second part 27b facing the second power storage device 2b. The first sloping surface 60 slopes away from the thermal conduction suppression part 26 in the inward direction in the frame part 24. The first sloping surface 60 is provided at the end of the second part 27b toward the hole 42. Therefore, the second part 27b has a tapered shape having a thickness (the size in the first direction X) that is progressively smaller in the inward direction in the power storage module 1.

The amount of swelling of the power storage device 2 is larger toward the central part than toward the peripheral part. For this reason, the thermal conduction suppression part 26 may be pressed against the corner of the second part 27b when the thermal conduction suppression part 26 is pressed toward the first power storage device 2a due to the swelling of the second power storage device 2b, with the result that the thermal conduction suppression part 26 may be damaged. By providing the first sloping surface 60, the damage to the thermal conduction suppression part 26 is inhibited. Accordingly, the reliability of the power storage module 1 is further enhanced.

Further, the third part 27c of this embodiment has a third sloping surface 62 on the side facing the thermal conduction suppression part 26, i.e., on the lateral surface 58 of the third part 27c facing the first power storage device 2a. The third sloping surface 62 slopes away from the thermal conduction suppression part 26 in the inward direction in the frame part 24. The third sloping surface 62 is provided at the end of the third part 27c toward the hole 42. Therefore, the third part 27c has a tapered shape having a thickness that is progressively smaller in the inward direction in the power storage module 1. By providing the third sloping surface 62, the thermal conduction suppression part 26 is inhibited from being damaged by being pressed against the corner of the third part 27c due to the swelling of the first power storage device 2a. Accordingly, the reliability of the power storage module 1 is further enhanced.

Embodiment 5

Figure 17:
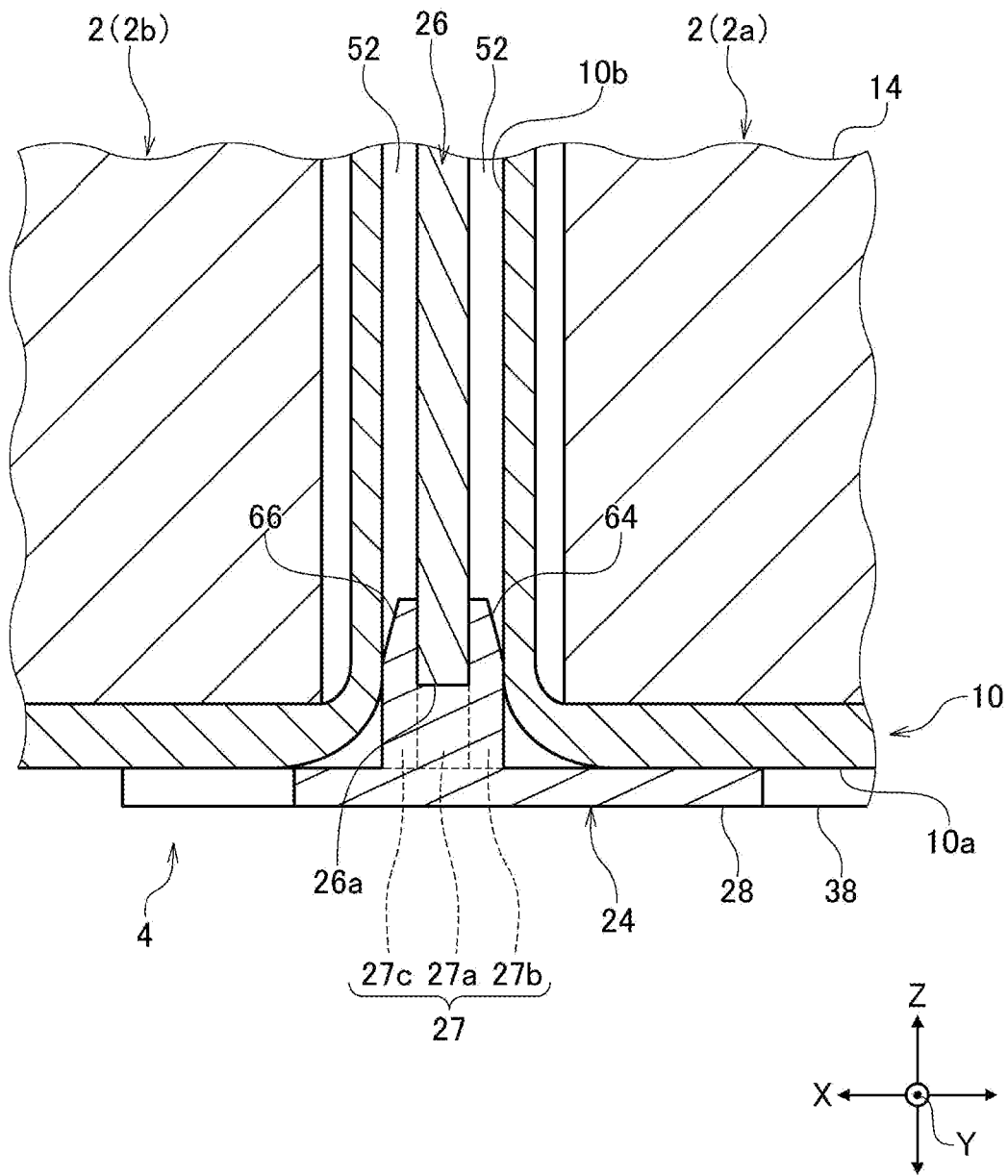
FIG. 17 is a cross-sectional view showing a part of the lower part of the power storage module according to embodiment 5 on an enlarged scale.

Embodiment 5 includes a configuration similar to that of embodiment 3 except for the shape of the frame part 24. The following description of this embodiment highlights features different from those of embodiment 3, and the description of the common features will be simplified or omitted. FIG. 17 is a cross-sectional view showing a part of the lower part of the power storage module according to embodiment 5 on an enlarged scale. FIG. 17 shows the internal structure of the power storage device 2 schematically.

The separator 4 provided in the power storage module 1 according to this embodiment includes the frame part 24 and the thermal conduction suppression part 26 as in embodiment 3. The frame part 24 includes: the hole 42 interposed between the first power storage device 2a and the second power storage device 2b and extending between the two power storage devices 2; and the locking part 27 for locking the thermal conduction suppression part 26. The locking part 27 includes a first part 27a, a second part 27b, and a third part 27c. The thermal conduction suppression part 26 is provided to block the hole 42 and is supported by the frame part 24. The first part 27a comes into contact with the a surface 26a of the thermal conduction suppression part 26 facing a direction intersecting the first direction X. The second part 27b is interposed between the thermal conduction suppression part 26 and the first power storage device 2a. The third part 27c is interposed between the thermal conduction suppression part 26 and the second power storage device 2b.

Further, the second part 27b of this embodiment has a second sloping surface 64 on the side facing the first power storage device 2a, i.e., on the lateral surface of the second part 27b facing the first power storage device 2a. The second sloping surface 64 slopes away from the first power storage device 2a in the inward direction in the frame part 24. The second sloping surface 64 is provided at the end of the second part 27b toward the hole 42. Therefore, the second part 27b has a tapered shape having a thickness that is progressively smaller in the inward direction in the power storage module 1.

By providing the second part 27b with the second sloping surface 64, it is possible to avoid the exterior can 10 of the first power storage device 2a from being pressed against the corner of the second part 27b due to the swelling of the first power storage device 2a. It reduces the likelihood of the exterior can 10 or the insulating tape, etc. covering the outer surface of the exterior can 10 from receiving a damage such as a dimple. Accordingly, the reliability of the power storage module 1 is further enhanced.

Further, the third part 27c of this embodiment has a fourth sloping surface 66 on the side facing the second power storage device 2b, i.e., on the lateral surface of the third part 27c facing the second power storage device 2b. The fourth sloping surface 66 slopes away from the second power storage device 2b in the inward direction in the frame part 24. The fourth sloping surface 66 is provided at the end of the third part 27c toward the hole 42. Therefore, the third part 27c has a tapered shape having a thickness that is progressively smaller in the inward direction in the power storage module 1.

By providing the third part 27c with the fourth sloping surface 66, it is possible to avoid the exterior can 10 of the second power storage device 2b from being pressed against the corner of the third part 27c due to the swelling of the second power storage device 2b. It reduces the likelihood of the exterior can 10 or the insulating tape, etc. covering the outer surface of the exterior can 10 from receiving a damage such as a dimple. Accordingly, the reliability of the power storage module 1 is further enhanced.

Embodiments of the present disclosure are described above in detail. The embodiments described above are merely specific examples of practicing the present disclosure. The details of the embodiments shall not be construed as limiting the technical scope of the present disclosure. A number of design modifications such as change, addition, deletion, etc. of constituting elements may be made to the extent that they do not depart from the idea of the disclosure defined by the claims. New embodiments with design modifications will provide the combined advantages of the embodiment and the variation. Although the details subject to such design modification are emphasized in the embodiments by using phrases such as "of this embodiment" and "in this embodiment", details not referred to as such are also subject to design modification. Any combination of constituting elements included in the respective embodiments is also useful as an embodiment of the present disclosure. Hatching in the cross section in the drawings should not be construed as limiting the material of the hatched object.

In the power storage module 1 according to embodiments 1 and 2, the separator 4 may not include the thermal conduction suppression part 26. In other words, the separator 4 may only be comprised of the frame part 24. Alternatively, the separator 4 may include a flat plate part not having the hole 42, instead of the frame part 24. In this case, the separation area 48 is provided in an area of the flat part that overlaps the joint part 20 in the first direction X. Further, the entire area of the flat plate part excluding the separation area 48 may form the contact area 46, but it is preferred that only the area overlapping the peripheral part of the longer-side lateral surface 10b as viewed in the first direction X form the contact area 46. In other words, it is preferred that the air gap 52 be formed in an area overlapping the electrode body 14 as viewed in the first direction X. Still alternatively, the separator 4 may not include the wall part 28.

The disclosure is non-limiting as to the number of power storage devices 2 provided in the power storage modules 1. The structure of the parts of the power storage module 1, including the shape of the wall part 28 of the separator 4 and the structure for fastening the endplate 6 and the binding member 8, is not limited to any particular structure. The power storage module 1 may include a bus bar plate. A bus bar plate is a plate member provided to face the top surfaces of the plurality of power storage devices 2 to cover the top surfaces. The opening 12 of the exterior can 10 may be shaped in a rectangle such as a square or in a polygon other than a rectangle.

Variation 1 described below is available for the power storage module 1 according to embodiments 3-5.

(Variation 1)

Figure 18:
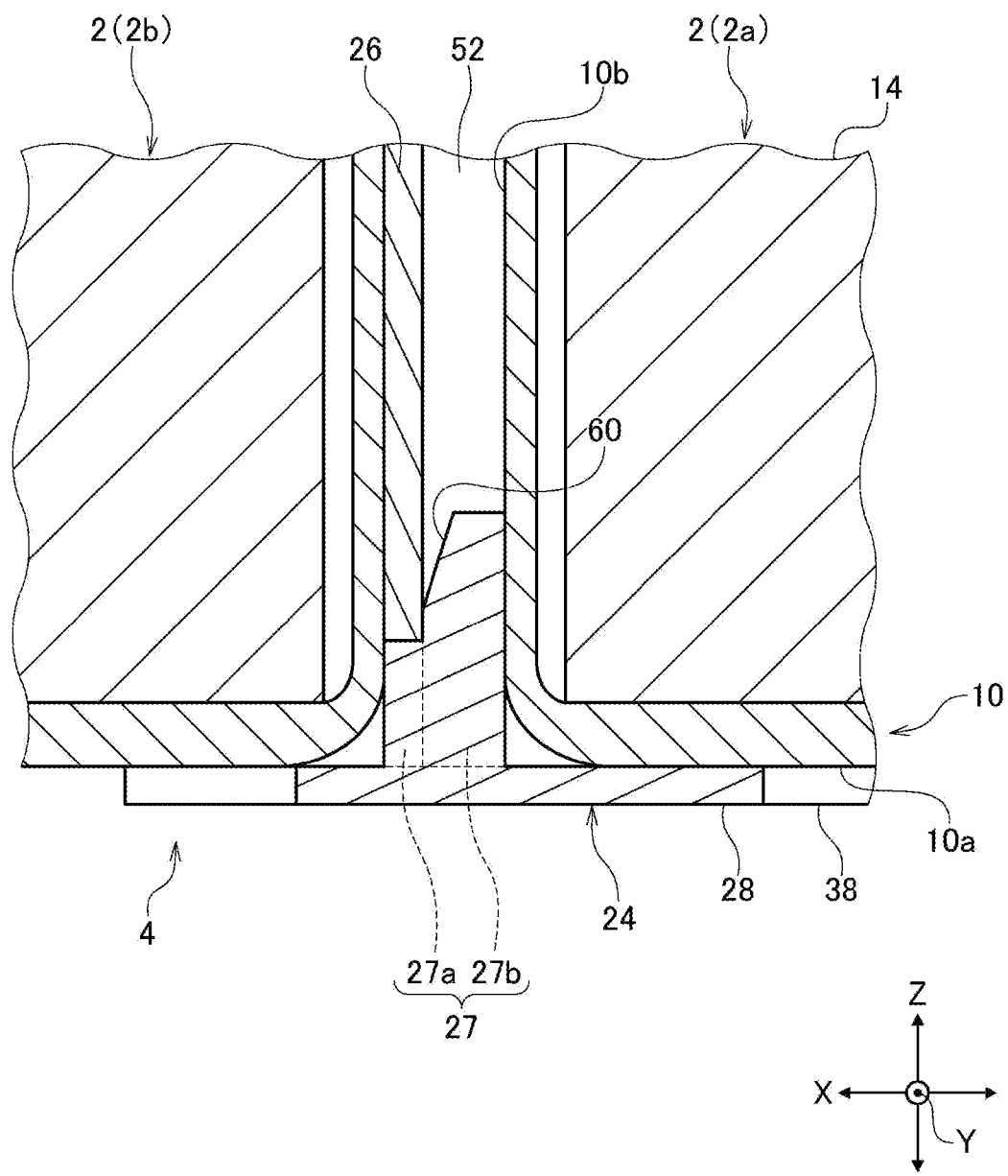
FIG. 18 is a cross-sectional view showing a part of the lower part of the power storage module according to variation 1 on an enlarged scale.

FIG. 18 is a cross-sectional view showing a part of the lower part of the power storage module 1 according to variation 1 on an enlarged scale. FIG. 18 shows the internal structure of the power storage device 2 schematically. The locking part 27 of variation 1 includes the first part 27a and the second part 27b but does not include the third part 27c. It is still possible to provide the air gap 52 between the thermal conduction suppression part 26 and the first power storage device 2a even without the third part 27c. Therefore, the amount of compression of the thermal conduction suppression part 26 due to the swelling of the exterior can 10 can be reduced, as described in embodiment 3.

FIG. 18 shows the second part 27b having the first sloping surface 60 (corresponding to a structure in which the third part 27c is omitted in embodiment 4), but variation 1 is not limited to this structure. The second part 27b may have the second sloping surface 64 (corresponding to a structure in which the third part 27c is omitted in embodiment 5), or the second part 27b may not have the first sloping surface 60 and the second sloping surface 64 (corresponding to a structure in which the third part 27c is omitted in embodiment 3).

(Other Variations)

The second part 27b may include both the first sloping surface 60 and the second sloping surface 64. Similarly, the third part 27c may include both the third sloping surface 62 and the fourth sloping surface 66. Further, the first sloping surface 60-the fourth sloping surface 66 may be combined as desired. The second part 27b and/or the third part 27c may not be provided over the entirety of the frame part 24. In other words, the second part 27b and/or the third part 27c may be provided intermittently around the hole 42. Similarly, the first sloping surface 60-the fourth sloping surface 66 may be provided intermittently around the hole 42. Further, the first part 27a-the third part 27c may not be integrated with each other and may be spaced apart from each other at predetermined distances.

In embodiments 3-5 and variation 1, the first power storage device 2a and the second power storage device 2b are arbitrary two power storage devices 2 of the plurality of power storage devices 2. While it is preferred that all separators 4 provided in the power storage module 1 have the structure described in the embodiments or variation 1, at least one separator 4 may have the structure as described.

The disclosure is non-limiting as to the number of power storage devices 2 provided in the power storage modules 1. The structure of the parts of the power storage module 1, including the shape of the wall part 28 of the separator 4 and the structure for fastening the endplate 6 and the binding member 8, is not limited to any particular structure. The power storage module 1 may include a bus bar plate. A bus bar plate is a plate member provided to face the top surfaces of the plurality of power storage devices 2 to cover the top surfaces. The opening 12 of the exterior can 10 may be shaped in a rectangle such as a square or in a polygon other than a rectangle.

The invention claimed is:

1. A power storage module comprising:
a plurality of power storage devices arranged in a first direction; and
a separator provided between two adjacent power storage devices and insulating the two adjacent power storage devices from each other, wherein
each power storage device includes an exterior can that has an opening and a bottom surface, a sealing plate that extends in a second direction intersecting the first direction to block the opening and that is opposite to the bottom surface, and a joint part between the exterior can and the sealing plate, and
the separator includes a contact area that abuts a surface of the exterior can facing the first direction and a separation area that overlaps the joint part as viewed in the first direction and is displaced with respect to the contact area in a direction away from the exterior can as viewed in the second direction.

2. The power storage module according to claim 1, wherein
the separation area overlaps the entirety of the joint part in a second direction in which the sealing plate extends, as viewed in the first direction.

3. The power storage module according to claim 1, wherein
the separation area overlaps the entirety of the joint part in a direction of thickness of the sealing plate.

4. The power storage module according to claim 1, wherein
the separation area protrudes beyond the sealing plate as viewed in the first direction toward the bottom surface.

5. The power storage module according to claim 1, wherein
the separator includes a frame part,
the frame part includes a hole interposed between two adjacent power storage devices and extending between the two power storage devices, and
the contact area and the separation area are provided in the frame part.

6. The power storage module according to claim 5, wherein
the separator includes a thermal conduction suppression part, and
the thermal conduction suppression part is arranged to block the hole.

7. The power storage module according to claim 1, wherein
the separation area has a sloping surface that slopes obliquely with respect to the exterior can as viewed in the second direction, and the sloping surface slopes away from the sealing plate so as to be distanced from the exterior can toward the bottom surface.

8. The power storage module according to claim 5, wherein
a surface of the exterior can facing the first direction is rectangular,
the contact area overlaps three of four edges of the surface facing the first direction, and
the separation area overlaps a remaining edge of the four edges.

9. The power storage module according to claim 1, wherein
the power storage devices include a first power storage device and a second power storage device arranged in the first direction,
the separator is provided between the first power storage device and the second power storage device to insulate the two power storage devices from each other,
the separator includes a frame part and a thermal conduction suppression part,
the frame part includes a hole interposed between the first power storage device and the second power storage device and extending between the two power storage devices, and a locking part for locking the thermal conduction suppression part,
the thermal conduction suppression part is provided to block the hole and is supported by the frame part, and
the locking part includes a first part that comes into contact with a surface of the thermal conduction suppression part facing a direction intersecting the first direction and a second part interposed between the thermal conduction suppression part and the first power storage device.

10. The power storage module according to claim 9, wherein
the second part has, on a side facing the thermal conduction suppression part, a first sloping surface that slopes away from the thermal conduction suppression part in an inward direction in the frame part.

11. The power storage module according to claim 9, wherein
the second part has, on a side facing the first power storage device, a second sloping surface that slopes away from the first power storage device in an inward direction in the frame part.

12. The power storage module according to claim 9, wherein
the locking part includes a third part interposed between the thermal conduction suppression part and the second power storage device.

13. The power storage module according to claim 9, wherein
the third part has, on a side facing the thermal conduction suppression part, a third sloping surface that slopes away from the thermal conduction suppression part in an inward direction in the frame part.

14. The power storage module according to claim 9, wherein the third part has, on a side facing the second power storage device, a fourth sloping surface that slopes away from the second power storage device in an inward direction in the frame part.

15. The power storage module according to claim 9, wherein the frame part includes the contact area and the separation area.

16. The power storage module according to claim 15, wherein the separation area overlaps the entirety of the joint part in a second direction in which the sealing plate extends, as viewed in the first direction.

17. The power storage module according to claim 15, wherein the separation area overlaps the entirety of the joint part in a direction of thickness of the sealing plate.

18. The power storage module according to claim 15, wherein the separation area protrudes away from the sealing plate as viewed in the first direction toward the bottom surface.

\* \* \* \* \*